United States Patent
Ward et al.

(10) Patent No.: US 6,633,800 B1
(45) Date of Patent: Oct. 14, 2003

(54) REMOTE CONTROL SYSTEM

(75) Inventors: Robert S. Ward, Aurora (CA); James M. Law, Aurora (CA); Leif A. Bloomquist, North York (CA)

(73) Assignee: Ainsworth Inc., Aurora (CA)

( * ) Notice: Subject to any disclaimer, the term of this patent is extended or adjusted under 35 U.S.C. 154(b) by 92 days.

(21) Appl. No.: 09/774,014

(22) Filed: Jan. 31, 2001

(51) Int. Cl.[7] ................................. G06F 7/00
(52) U.S. Cl. ................... 701/2; 701/33; 701/36; 180/167; 180/168
(58) Field of Search ................ 701/1, 2, 33, 36, 701/41; 180/167, 168, 169; 348/114, 118, 119

(56) References Cited

U.S. PATENT DOCUMENTS

| | | | |
|---|---|---|---|
| 3,827,754 A | 8/1974 | Gilley | 299/30 |
| 4,698,456 A | 10/1987 | Hamacher | |
| 4,932,831 A | 6/1990 | White et al. | 414/732 |
| 4,986,384 A | 1/1991 | Okamoto et al. | 180/167 |
| 5,432,838 A | 7/1995 | Purchase et al. | |
| 5,465,395 A | 11/1995 | Bartram | 455/55.1 |
| 5,469,356 A | 11/1995 | Hawkins et al. | 364/424.02 |
| 5,579,285 A | 11/1996 | Hubert | 367/133 |
| 5,610,815 A | 3/1997 | Gudat et al. | |
| 5,646,843 A | 7/1997 | Gudat et al. | 364/424 |
| 5,657,226 A | 8/1997 | Shin et al. | 364/424 |

FOREIGN PATENT DOCUMENTS

| | | | |
|---|---|---|---|
| CA | 1095939 | 2/1981 | 262/81 |
| CA | 2049773 | 2/1993 | G05D/1/02 |
| CA | 2041373 | 11/1993 | G05D/1/02 |
| CA | 2057544 | 7/1997 | H04B/7/24 |
| CA | 2195734 | 7/1998 | G05D/1/02 |
| CA | 2260374 | 8/2000 | G05D/1/00 |

OTHER PUBLICATIONS

Myers, S.D., "Surrogate teleoperated vehicle (STV)", Proceedings of the National Telesystems Conference. Atlanta, Mar. 26–27, 1991, pp. 315–320.

Primary Examiner—Gertrude Arthur
(74) Attorney, Agent, or Firm—Bereskin & Parr

(57) ABSTRACT

An apparatus and method for a control unit which allows for autonomous, manual and tele-operation of mining vehicles. The control unit has a robust system design to withstand the harsh environment of underground mines. The control unit allows a tele-operator, in a remote tele-operator station, to use image and operational data, joysticks and foot pedals to remotely control the mining vehicle. In another aspect, the control unit provides safety features such as supervising its operation for operational errors and providing status, warning and error information to the tele-operator station.

64 Claims, 17 Drawing Sheets

REMOTE CONTROL SYSTEM

FIELD OF THE INVENTION

The present invention pertains to the remote control of a vehicle, and in particular, to a control system and method which allows for manual, autonomous and tele-operation of underground mining vehicle.

BACKGROUND OF THE INVENTION

Mine environments are inherently dangerous areas due to the instability of underground ore bodies. Around the world, there are numerous instances of ore bodies collapsing on mining vehicle operators. Mines are also very hot with high levels of dust. To accommodate the mining vehicle operators, air conditioned cabs are added to mining vehicles and an underground ventilation system is built inside the mine. However, in mining, for economic reasons, it is always desirable to keep infrastructure costs to a minimum.

Accordingly, there is a migration towards remote mining in which mining vehicles are controlled by an operator from a safe location. First generation remote mining schemes required the operator to have an open line of sight to the mining vehicle (i.e. be in the vicinity of the mining vehicle), however, this still placed the operator in the mine. In addition, the operator could only operate one mining vehicle at a time. Second generation remote mining schemes placed the operator, now referred to as a tele-operator, In a remote tele-operator station which may be below or above ground. In this remote mining scheme, the tele-operator has visual information about the mining vehicle, displayed l uia screen, to allow the tele-operator to visually monitor the mining vehicie's activities and environment.

Remote mining greatly increases the safety of underground mining since the mining vehicle operator is removed from areas where there are collapsing ore bodies. There is also an increase, in worker productivity and equipment utilization since the travel time needed to get the mining vehicle operator to the mining vehicle, which can be up to 1.5 hours, is eliminated. In addition, remote mining results in lower infrastructure cost.

In mining there is also a movement towards autonomous operation of mining vehicles since some mining operations are labor intensive and repetitive. Accordingly, the autonomous operation of mining vehicles has potential cost and labor savings. Furthermore, autonomous operation of mining vehicles allows the tele-operator to operate more than one mining vehicle since the tele-operator is only needed for specific operations such as when a Load Haul Dump (LHD) vehicle is loading or dumping. The cost of having an individual tele-operator for each mining vehicle is therefore avoided. Another benefit in autonomous mining vehicle operation is that tramming will be more consistent and accurate which is useful in mining areas where there are tight clearances. This is advantageous since mining vehicle operators routinely damage mining vehicles to the point where some mining vehicles last for only three months.

To facilitate the autonomous operation and tele-operation of a mining vehicle, a conventionally designed mining vehicle has the necessary control and comunications system added to it. This then allows for manual control of the mining vehicle which is important since autonomous operation is implemented only along high traffic routes such as from a work face to a locaton for dumping ore. Furthermore, there are occasions when a mining vehicle must be manually driven such as when the mining vehicle is taken to a service ceilbe for routine maintenance or refuelling.

Autonomous vehicles have already been used in a variety or industrial settings. However, the control, system used in an industrial setting cannot be readily applied to a mining vehicle. This is because a mining invironment is much harsher than a conventional factory environment. Thus, when control systems designed for industrial factory environments are applied to a mining vehicle, the result is poor systems reliability with failures often occurring due to mining environmental factors such as temperature, acidity, vibrations, etc. There is also constant wear and tear on these control systems since the enclosure and system connections are not air tight which allows moist air to enter controllers and damage internal electronics.

Prior art control systemic were based on Programmable Logic Controllers (PLCs) with separate commercially available modules being used to provide radio communication and image processing. This control system was expensive since the cost of a PLC and a video processor alone was significant. This control system was also hard to mass produce because the various subsystems rollowed different equipment practices and were not designed to operator together in a single package. This resulted in increased hardware complexity, complex wiring and a large system enclosure. PLC-based control systems also used a rock in which the I/O modules were stacked, which resulted in complex wiring and a control system that had to be cutomized for a particular vehicle. This design made system maintenance troubleshooting and transferal of the control system from one mining vehicle to another difficult.

The vision system of the prior art mining vehicle control systems utilized scanning lasers for guidance. However, the guidance system is inherently fragile since the guidance scanning lasers, mounted on top of the mining vehicle, quite often get damaged or knocked off due to overhanging ventilation pipes and the like or rock falls which occur when the mining vehicle is digging. Typically a mining vehicle can lose a couple of guidance scanning lasers per month which can be very expensive since a guidance scanning laser costs approximately 10,000 dollars Canadian.

A PLC-based control system is also difficult to troubleshoot since control system information is stored in a number of registers implemented in memory. To troubleshoot a PLC-based control system, one needs to access the correct registers. Thus, there is a need for a control system which can provide diagnostic information. Furthermore, there is a need for powerful on-line program editing and debugging tools and the ability to download programs to support control systems from a remote location. Remote maintenance support is important since mining vehicles can be operating in remote parts of the world.

Accordingly, there is a need for a robust control system which can withstand the harsh mining environment. Furthermore, the control system should have an application specific design which will result in a smaller unit, with simplified connections to allow for easy maintenance. In addition, the control system should allow for long distance maintenance support.

SUMMARY OF THE INVENTION

The present invention provides a control unit, for mounting with a machine for enabling control thereof from a tele-operator station via a communications channel. The control unit comprises a control input for receiving control signals from the tele-operator station and a digital processing means connected to the control input for processing the control signals and generating commands. The control unit further includes a control output for providing the commands to the machine and a second input connected to the digital processing means for receiving data from sensors on the machine indicative of the location and status of the machine. The control unit also has a data output for providing visual data to the tele-operator station. The control unit is adapted to operably switch between a manual mode in which the machine is controlled locally by controls on the machine, an autonomous mode in which the machine is controlled by data received through the second input, and a tele-operation mode in which the machine is controlled remotely by the control signals based at least in part on the visual data.

In another aspect, the present invention provides a control unit, for mounting on a machine, for enabling control thereof from a tele-operator station via a communications channel. The control unit comprises a control input for receiving control signals from the tele-operator station, and a digital processing means connected to the control input for processing the signals and generating commands. The digital processing means comprises a main processor and a supervisory processor connected to the main processor for monitoring the main processor to ensure safe operation of the machine. The control unit further includes a control output for providing the commands to the machine, and, a second input for receiving data from sensors on the machine indicative of the status of the machine. The control unit also has an enclosure that is adapted to prevent ingress of contaminants. The digital processing means is located in the enclosure.

In another aspect, the present invention provides a method of controlling a machine from a remote tele-operator station via a communications channel, the method comprising:
(a) providing the machine with a control unit capable of enabling at least two modes of operation selected from the group consisting of manual operation, autonomous operation, and tele-operation;
(b) selecting a desired mode of operation from the at least two modes of operation;
(c) operating the machine in the desired mode of operation; and,
(d) receiving visual data from the control unit at the tele-operator station enabling activity of the machine to be monitored in at least one of the two modes of operation.

A control unit, for mounting on a machine, for enabling control thereof from a tele-operator station via a communications channel, the control unit comprising:
(1) a control input for receiving control signals from the tele-operator station;
(2) a digital processing means connected to the control input for processing the signals and generating commands,
(3) a control output for providing the commands to the machine; and,
(4) a second input for receiving data from sensors on the machine indicative of the status of the machine, wherein, the digital processing means comprises a main processor and a supervisory processor connected to the main processor for monitoring the main processor to ensure safe operation of the machine, and wherein at least one of: the main processor provides periodic status signals to the supervisory processor to indicate correct operation of the main processor; and the supervisory processor randomly queries the status of the main processor, to ensure correct operation of the main processor.

(3) guiding the vehicle along said selected path. The autonomous mode of operation further includes, providing for the vehicle to travel along a plurality of slotted paths, and for each path, first causing the vehicle to traverse a path in the tele-operation mode and simultaneously recording operator inputs, and, in subsequent autonomous mode operation, providing for the control unit to use the operator inputs for travelling each path.

BRIEF DESCRIPTION OF THE FIGURES

For a better understanding of the present invention, and to show more clearly how it may be carried into effect, reference will now be made by way of example to the accompanying drawings in which.

DETAILED DESCRIPTION OF THE PREFERRED EMBODIMENT

The present invention is a control system for remote mining which allows a tele-operator to control a mining vehicle from a remote location. The present invention also allows for autonomous and manual operation of the mining vehicle. For the purposes of describing the present invention, the specific example of controlling an LHD vehicle will be used. However, the present invention can interface with virtually any proprietary mining vehicle.

Figure 1:
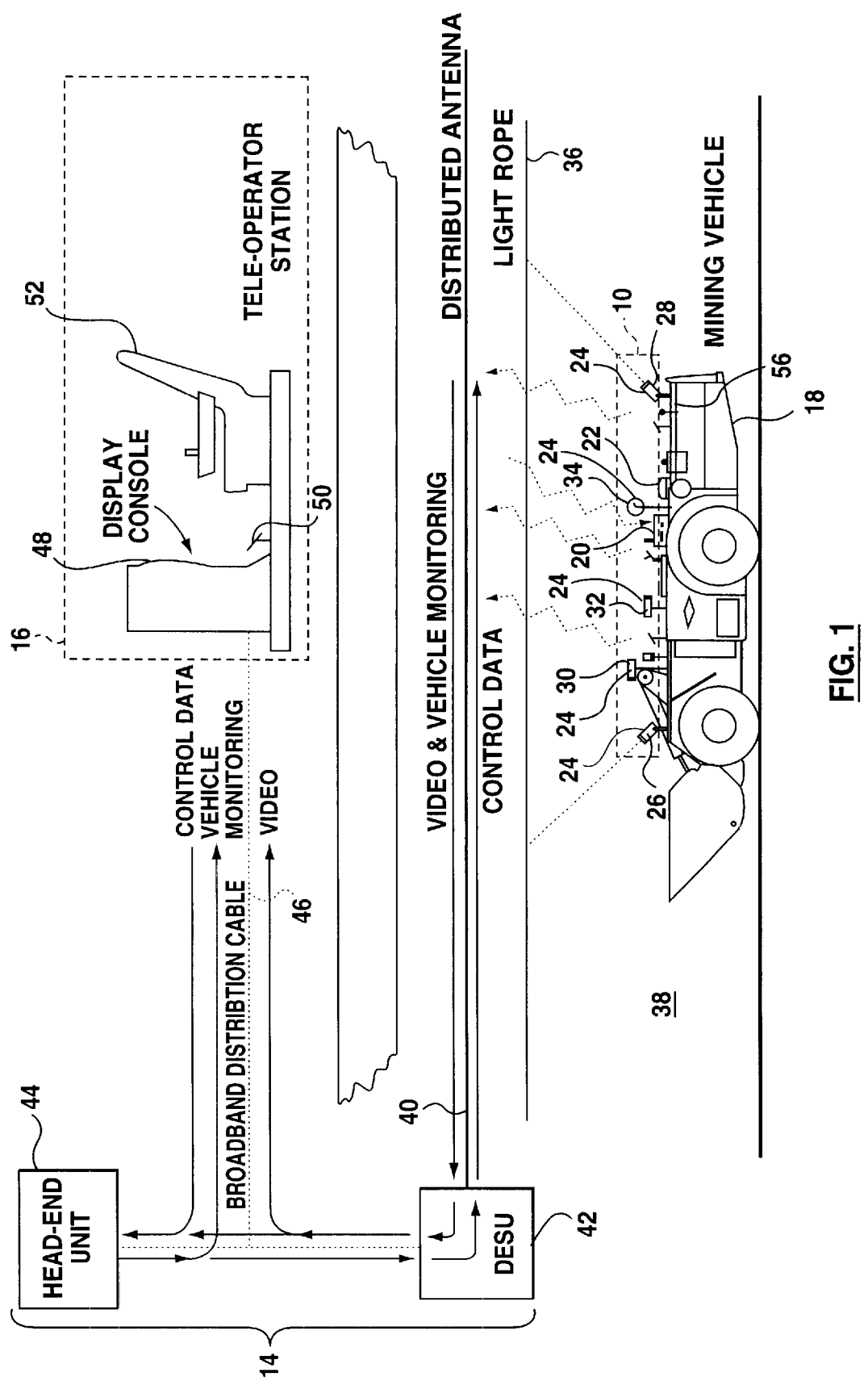
FIG. 1 is a diagram of the preferred embodiment of the present invention.

A control system for remote mining, in accordance with the present invention, is shown generally as 10 in FIG. 1. The control system 10 is coupled to a tele-operator station 16 via a communications channel 14. The control system 10, mounted on a mining vehicle 18, comprises a control unit 20, at least one DeviceNet I/O module 22 and a vision system 24. The vision system 24 comprises a plurality of vision sensors, namely a front guidance camera 26, a rear guidance camera 28, a front tele-operation camera 30, a rear tele-operation camera 32 and a UV light source 34 mounted on the mining vehicle 18. The vision system 24 also comprises a light rope 36 installed in a mine drift 38. The communications channel 14 comprises distributed antennas 40, Distributed antenna translator Extended Services Units (DESUs) 42, a head-end unit 44 and a broadband distribution cable 46. The communications channel is preferably in accordance with the assignee's earlier U.S. Pat. No. 5,432,838, the contents of which are hereby incorporated by reference. Alternatively, any other broadband communications channel suitable for a mining environment may be used. The tele-operator station 16 has a display console 48, foot pedals 50 and a chair 52.

Figure 2:
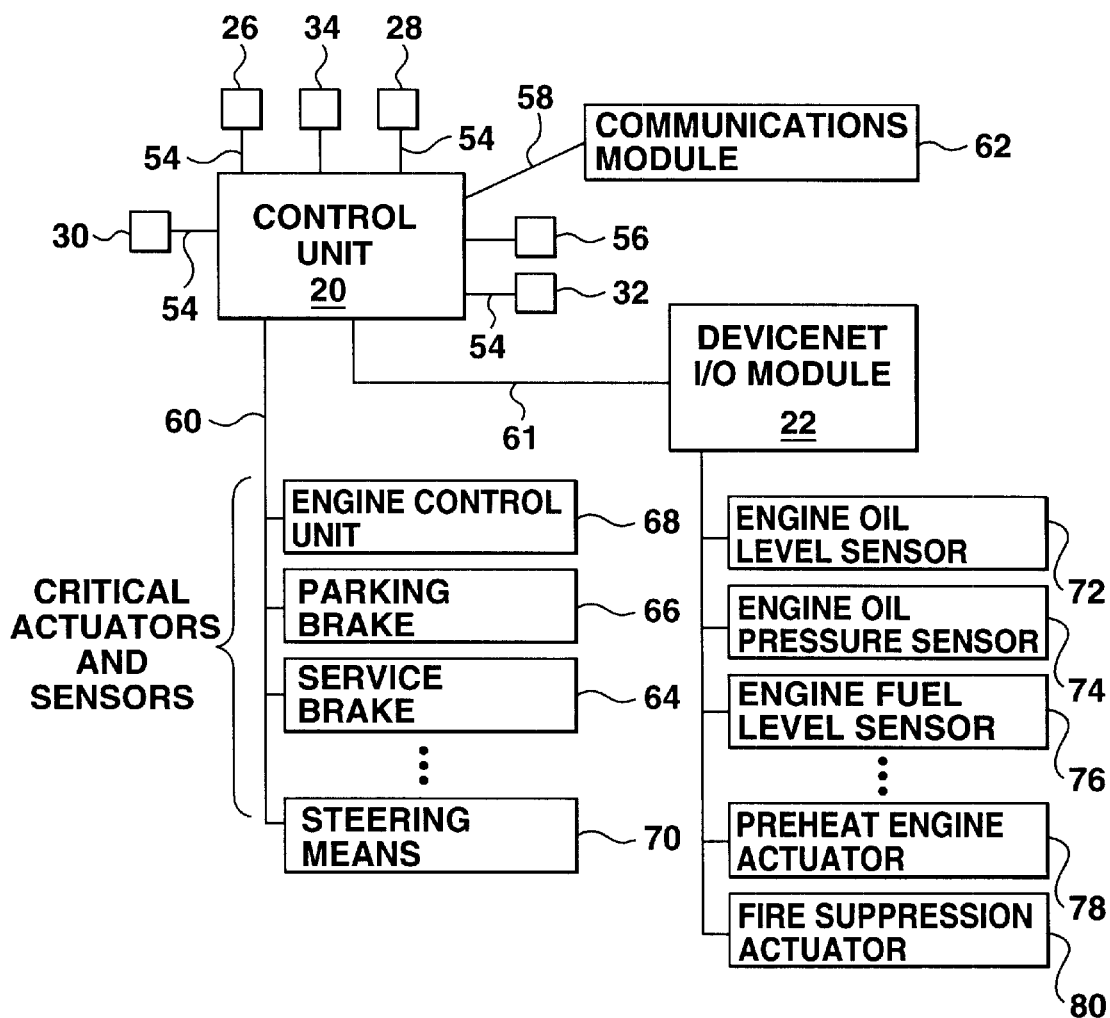
FIG. 2 shows the connections in a typical installation of the present invention.

Referring to FIG. 2, a typical installation of the control system 10 on the mining vehicle 18 (which can either be electric or hydraulic) would preferably include the control unit 20, four camera cables 54, two guidance cameras 26 and 28, two tele-operation cameras 30 and 32, a microphone 56 (installed near the engine of the mining vehicle 18), a communications cable 68, a critical I/O cable 60 and a DeviceNet cable 61. The camera cables 54 connect the guidance cameras 26 and 28 and the tele operation cameras 30 and 32 to the control unit 20. The communication cable 58 connects the control unit 20 with a communications module 62 on-board mining vehicle 18. The critical 110 cable 60 connects the control unit 20 with the I/O devices onboard the mining vehicle 18 (i.e. critical actuators and sensors) that are critical to the safe operation of the mining vehicle 18 such as a service brake 64 (i.e. the normal operational brake), a parking brake 66 (i.e. emergency brake), an engine control unit 68 (to control the speed of the mining vehicle 18), a esteering means 70 (to control the steering of the mining vehicle 18), vehicle driveline sensors (not shown) and the like. This allows the control unit 20 to control the speed and direction of the mining vehicle 18. The DeviceNet cable 61 connects the control unit 20 to the DeviceNet I/O module 22 which connects to the various I/O devices, such as sensors and actuators, on-board the mining vehicle 18. Exemiplary sensors include an engine oil level sensor 72, an engine oil pressure sensor 74, an engine fuel level sensor 76, and the like Exemplary actuators include a preheat engine actuator 78, a fire suppression actuator 80, and the like.

The vision system 24 provides a live view of the immediate environment of the mining vehicle 18 and is also used in the autonomous operation of the mining vehicle 18. To provide a live view of the immediate environment of the mining vehicle 18, the front tele-operation camera 30 is installed on the mining vehicle 18 facing forwards and the rear tele-operation camera 32 is installed on the mining vehicle 18 facing rearwards, in a manner to simulate the view that would be seen by an operator sitting in the mining vehicle 18. To provide for the autonomous operation of the mining vehicle 18, the front guidance camera 26 is installed on the mining vehicle 18 in a forward vertically oriented position and the rear guidance camera 28 is installed on mining vehicle 18 in a rearward vertically oriented position. Both the front and rear guidance cameras 26 and 28 are oriented such that the light rope 36 is in their field of view. Video cameras are used instead of scanning lasers for guidance since, at the present time, the cost of a scanning laser is more than 10 to 100 times the cost of a simple video camera. In total, up to four video cameras may be installed so it is desirable to keep them cheap, simple and easy to replace. A UV light source 34 is mounted generally centrally on the mining vehicle 18 and is pivotable between a forward vertically oriented position and a rearward vertically oriented position depending on the direction of travel for the mining vehicle 18. The UV light source 34 is used to illuminate the light rope 36 as will be described later and as detailed in assignee's U.S. patent application (Ser. No. 09/060134), the contents of which are hereby incorporated by reference. Alternatively, a self-illuminating light rope, which contains small, embedded incandescent lamps, may be used in which case the UV light source 34 is not needed. Furthermore, a light rope 36 which consumes less power and has a longer life would also be suitable. The UV light source 34 and the cameras 26, 28, 30, and 32 have to be manually adjusted as part of a normal servicing routine to ensure they are pointing in the right direction.

The control system 10 also includes the microphone 66 installed on mining vehicle 18 which provides audio information shout the immediate environment or the mining vehicle 18 and about the mining vehicle 18 itself such as engine noise. Up to two microphones can be installed on mining vehicle 18. The audio information is incorporated with the video information and in then transmitted to the tele-operator station 16 via communications channel 14. It has been found in practice that experienced mining vehicle operators can derive significant information from audio information and will use this to adjust the operation of the mining vehicle 18 accordingly.

The communications channel 14 provides broadband communication between the control system 10 and the tele-operator station 16. The communications channel 14 carries control signals from the tele-operator station 16 to the control unit 20 and monitoring information from the control unit 20 to the tele-operator station 16. The communications channel 14 can be any broadband underground communications system that provides the necessary video and data links. Preferably, communications channel 14 comprises a plurality of distributed antennas 40 (i.e. leaky feeder cables) which radiate and receive signals at all points along their length. Each of the distributed antennas 40 is a length of coaxial cable with a very large bandwidth that runs along a portion of a mine drift 38, and by using a large number of distributed antennas, communication can be established with all parts of the mine requiring communications end automation services. The distributed antennas 40 are interfaced to the broadband distribution cable 46 by one or more DESUs 42 and one or more head-end units 44. The DESUs 42 transfer data between the broadband distribution cable 46 and the distributed antennas 40, and where required, provide translation of frequency and the like; this is described in greater detail in U.S. Pat. No. 5,432,838. The DESUs 42 monitor two video signals, received from the control unit 20, which show the same image that is recorded from either the front tele-operation camera 30 or the rear tell operation camera 32. The DESUs 42 then transmit the better video signal to the broadband distribution cable 46. This scheme compensates for the signal strength variation that occurs when the mining vehicle 18 moves.

The tele-operator station 16 can be situated at any point in the mine with access to the broadband distribution cable 40. All operational functions on the mining vehicle 18 are available at the tele-operator station 16. In addition, the operational status and the alarms of the mining vehicle 18 are communicated to and are shown at the display console 48. The tele-operator station 16 allows for the supervision of many mining vehicles 18 since a tele-operator 82 can communicate with several mining vehicles. For instance, the tele-operator 82 can begin by operating one mining vehicle. 18, then allow the mining vehicle 18 to operate autonomously (which is further discussed below) and choose another mining vehicle 18 to control.

Figure 3:
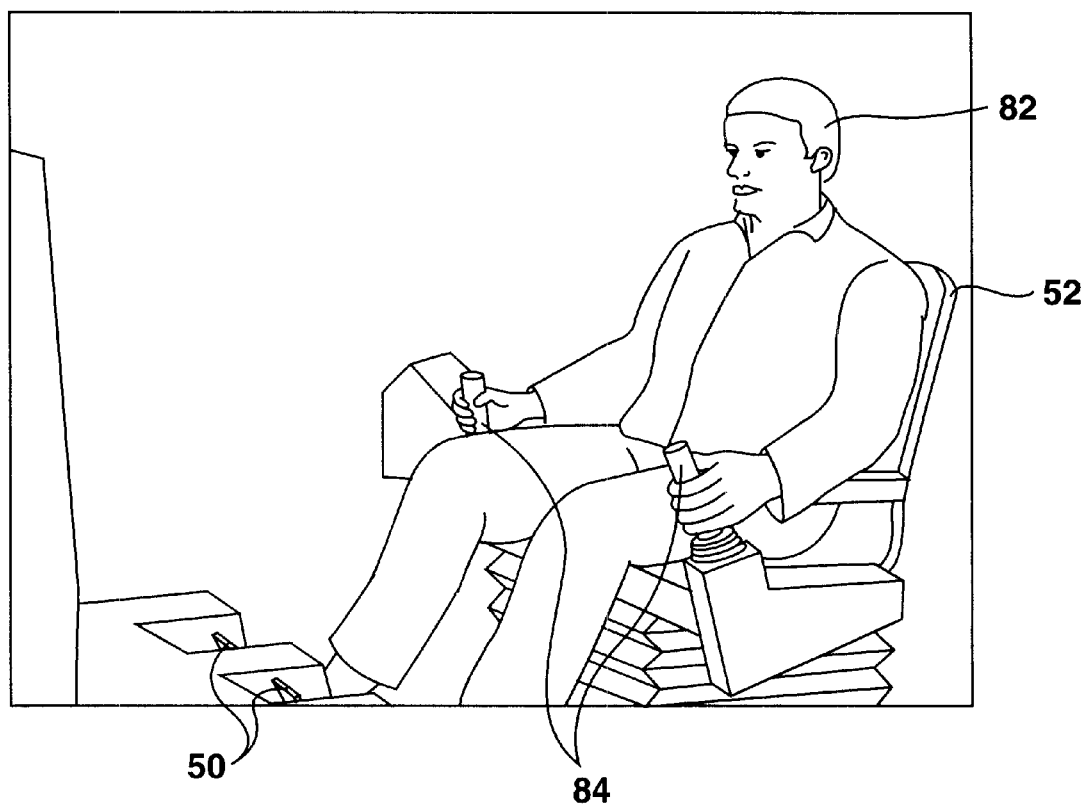
FIG. 3 shows a tele-operator sitting in the tele-operator chair in the tele-operator station.

Referring to FIG. 3, the tele-operator 82 sits in the chair 52 and controls the mining vehicle 18 with joystick controllers 84 and foot pedals 50. The joystick controllers 84 are situated on each arm of the chair 52 while the foot pedals 50 are located in front of the chair 52 near the floor. The joystick controllers 84 are used to steer the mining vehicle 18 while the foot pedals 50 allow the tele-operator 82 to control the throttic and brakes on the mining vehicle 18. The overall layout is, to at least some extent, intended to simulate the control layout that would be found in a control cabin of a mining vehicle.

Figure 4:
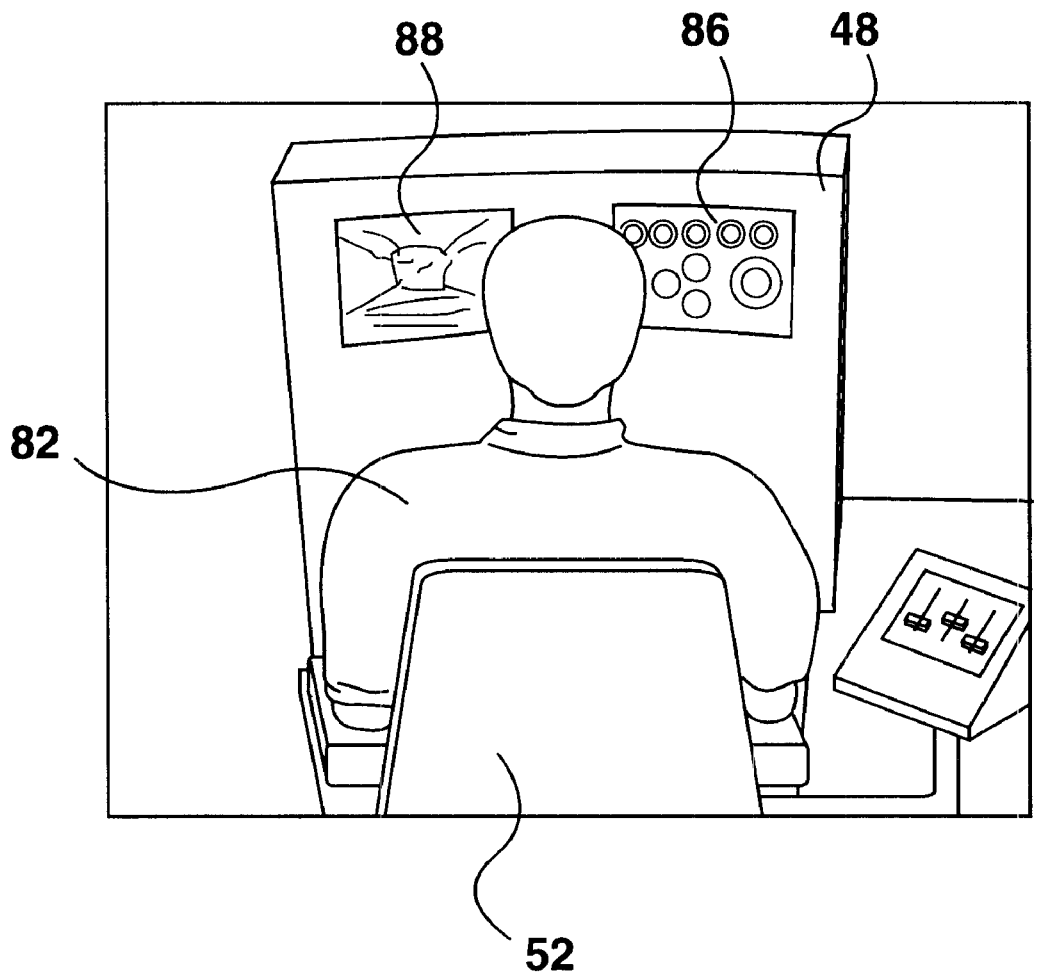
FIG. 4 shows the tele-operation screen and the computer graphics screen at the tele-operator station.

Referring to FIG. 4, the display console 48, situated in front of the chair 52, has a computer graphics screen 86 and a tele-operation screen 88. The computer graphics screen 86 shows computer generated displays, selectable by the tele-operator 82, which include a virtual dashboard of the mining vehicle 18 and an active map of the mine. The virtual dashboard displays instruments which indicate values for important operating parameters for the mining vehicle 18 such as oil level, hydraulic pressure, etc. This information is provided by the control system 10. The active map of the mine shows the location of the mining vehicle 18 within the mine.

The tele-operation screen 88 displays a programmable video overlay image which displays live video received from the mining vehicle 18. The image on the tele-operation screen 88 will automatically switch between the tele-operation cameras 30 and 32 depending on which operation the mining vehicle 10 is performing. For instance, if the mining vehicle 18 changes from a forward direction to a rearward direction, then the image on the tele-operation screen 88 is switched from the front tele-operation camera 30 to the rear tele-operation camera 32.

Figure 5:
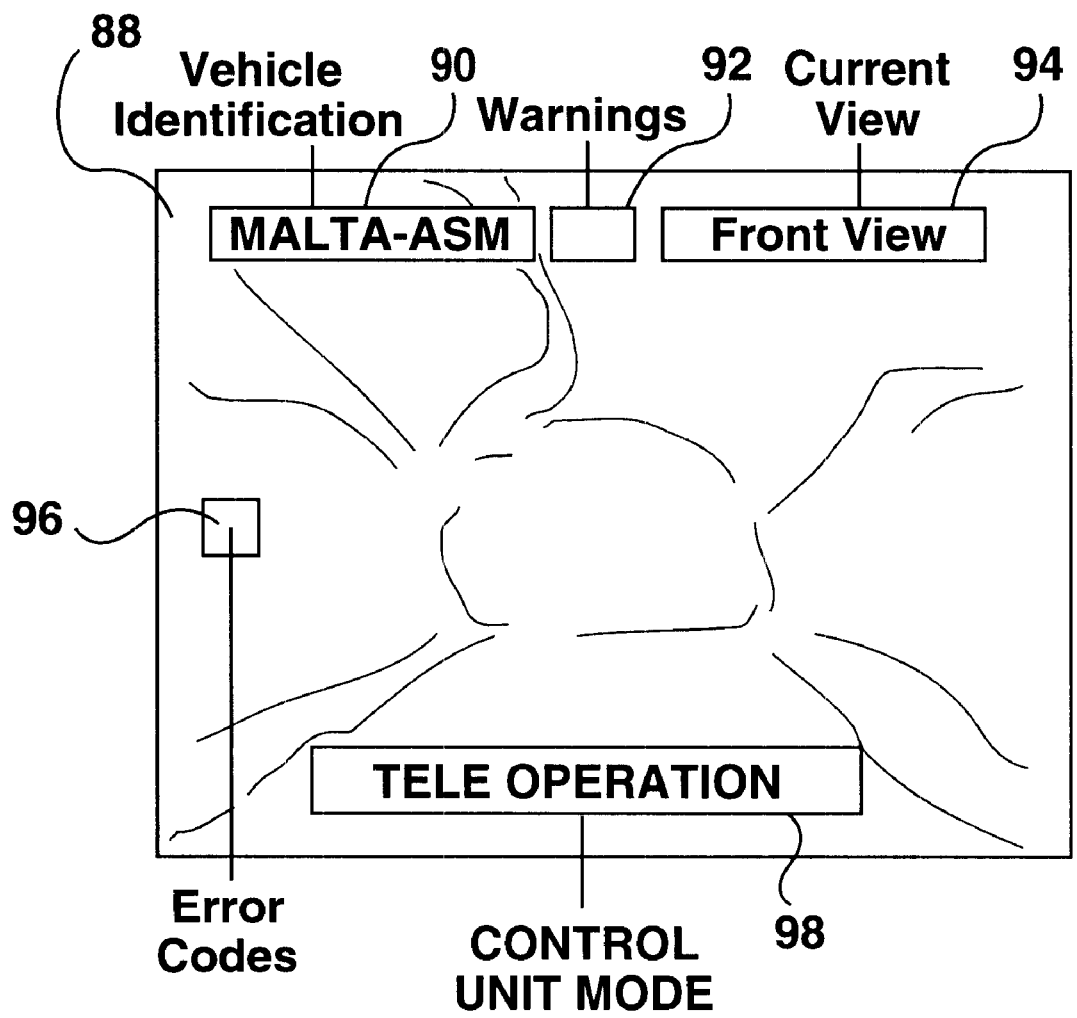
FIG. 5 shows the screen layout of the tele-operation screen.

The video overlay inmage on the tele operation screen 88 displays messages about mining vehicle 18. Referring to FIG. 5, the tele-operation screen 88 has a vehicle identification field 90, a warnings field 92, a current view riled 94, an error code field 96 and a control unit mode field 98. The vehicle identification field 90 indicates the identity of the mining vehicle 18. The warnings field 92 shows messages that warn the tele-operator 82 of an impending problem with the mining vehicle 18 or the control system 10. The current view field 94 indicates the current view shown on the tele-operation screen 88. The error code field 96 indicates that a fault has been found during a self-check performed on the control unit 20 or an improper command has been received from the tele-operator 82. The control unit mode field 98 identifies the current operating mode of the control unit 20.

Figure 6:
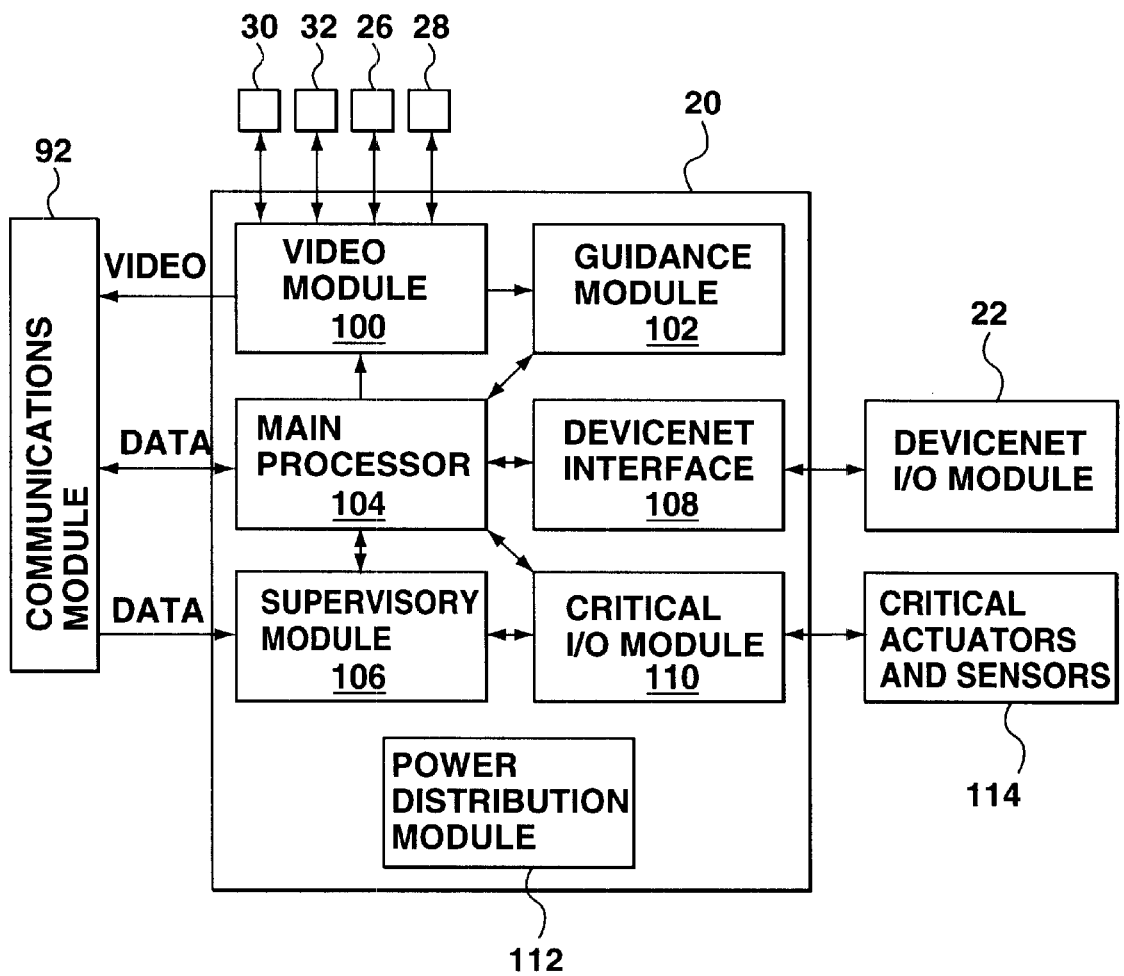
FIG. 6 shows the modular organization of the control unit.

Referring to FIG. 6, conceptually, the main elements of control unit 20 are a video module 100, a guidance module 102, a main processor 104, a supervisory module 106, a DeviceNet interface 108, a critical I/O module 110 and a power distribution module 112. The connections and direction of data flow are shown by the arrows. The power distribution module 112 supplies power to all of the mudules and for the sake of simplicity these connections have been omitted. Exterior to the control unit 20 but important to the operation of the control system 10, are the DeviceNet I/O module 22 and the communications module 62. Furthermore, the critical I/O module 110 is connected to critical actuators and sensors 114 (further described below) on-board the mining vehicle It which are important to the safe operation of the mining vehicle 18. Alternatively, the DeviceNet interface 108 and the DeviceNet I/O module 22 can be replaced with devices and networks that implement the ModBus, ModBus Plus or CAN protocols.

The video module 100 comprises a video multiplexer, a pre-amplifier, an audio multiplexer, a modulator, up-down converters, a processor/overlay generator and a power supply sub-system. The video module 100 processes video signals provided by the front guidance camera 26, the rear guidance camera 28, the front tele-operation camera 30 and the rear tele-operation camera 32. The video module 100 can support both NTSC and PAL video signal formats. The video module 100 also processes audio signals from the microphone 56 on the lining vehicle 18 by applying pre-amplification and matching. The video module 100 multiplexes the audio and video signals into three separate channels. Two of the channels, containing the current tele-operating view, are routed to video transmitters which send tile video signals to the communications module 62 which in turn sends RF signals to the distributed antennas 40. The third channel carries the view from the guidance camera in current use and is routed to the video capture channel on the guidance module 102. The video module 100 also provides camera support functions which include supply power, heater power (i.e. to prevent lines logging), synchronization and light control.

The guidance module 102, which includes a Digital Signal Processor (DSP) and a video card 192, implement& the vision guidance system used during the autonomous operation of the mining vehicle 18. The guidance module 102 performs capture and real-time processing of the video signal from either of the front and rear guidance cameras 26 and 28. The video signal is then digitized and stored in frame buffers which are accessible by the vision guidance system. The vision guidance system then performs an analysis on the digitized video information and sends this analysis to the main processor 104 which controls the movements of the mining vehicle 18.

The main processor 104 is the processing core of the control unit 20. The main processor 104 is preferably the AMD K6 350 MHz processor (supplied by AMD), which is capable of performing 350 million operations per second. Alternatively, another high performance processor may be used. The main processor 104 preferably runs under the Microsoft Windows™ NT operating system (supplied by Microsoft Corporation) which provides a real-time multi-tasking environment. Alternatively another operating system such as QNX™ or Linux™ could be used.

The main processor 104 control 104 controls all of the modules in the control unit 20 except tour the supervisory module 106. In particular, the main processor 104 configures various components in the control unit 20, decodes and processes the commands received from the tele-operator 82, handles all communication between the control unit 20 and the tele-operator station 16 and runs the software for the control system 10. The main processor 104 also controls the operation of the mining vehicle 18 according to commands received from the tele-operator 82. In addition, the main processor 104 operator most of the I/O relays, monitors the internal power supply voltages and monitors the state of the critical I/O relays. The I/O relays are used to disable and enable actuators located on-board the mining vehicle 18. The I/O relays will be further described below.

The main processor 104 maintains communication between the various internal modules within the control unit 20. In addition, the main processor 104 provides diagnostic channels, both to the mining vehicle 18 and the tele-operator station 16 to assist in the troubleshooting and monitoring of the control system 10. The main processor 104 also performs video signal switching in which the video signal, which is displayed on the tele-operation screen 88, is automatically switched to the most appropriate tele-operation camera for the current operation and/or direction of travel for the mining vehicle 18. The main processor 104 also implements the video overlay (in conjunction with the video module 100) in which the video overlay image on the tele-operation screen 88 is updated in real-time to reflect the identity and operational status of the mining vehicle 18.

The DeviceNet interface 108 allows the main processor 104 to communicate with the peripheral I/O devices (i.e. sensors and actuators) located on the mining vehicle 18 through Windows™ NT drivers. A DeviceNet network is a low-cost communications link that connects industrial devices and a microprocessor in a network and eliminates expensive hardwiring. This connectivity provides improved communication between the networked devices as well as important device-level diagnostics not easily accessible or available through hardwired I/O interfaces. A device.net software file is used in conjunction with the DeviceNet interface 108 to configure the DeviceNet network of sensors and actuators. The device.net file indicates which peripheral I/O devices are on the mining vehicle 18. If different peripheral I/O devices are installed on the mining vehicle 18, all that is needed to reflect this is a change to the device.net file.

The supervisory module 106 comprises monitnring circuitry (to measure voltage levels and relay states), a processor and an RS232 serial interface to the control unit 20. Tale supervisory module 106 contnually monitors the control unit 20 for propcr operation and has the capability to stop or prevent the mining vahicle 18 from operating if a fault occurs. The supervisory module 106 follows the principle of "parallel diverse system" to second-guess the operation of the control unit 20 and all of its associated inputs and outputs. To accomplish this, the supervisory module 105 receives the commands from the tele operator 82 and the corresponding responses of the main processor 104 via a separate protected internal data channel. Based on this information, the supervisory module 106 judges the validity and intention of the received commands from the tele-operator 82 and the proposed actions of the main processor 104. In addition, the supervisory module 106 continually sends random status inquiry signals to the main processor 104 and verifies whether tha main processor 104 responds correctly. The main processor 104 also informs supervisory module 106 before performing any potentially dangerous actions, such as movement of the mining vehicle 10. The supervisory module 106. confirms that the action proposed by the main processor 104 is correct and safe based on its own assessment of the operational status of the mining vehicle 13 and the commands received from the tele-operator 82. The supervisory moudule 106 is also responsible for vehicle wake-up and vehicle sleep.

The supervisory module 106, through the use of a simple proprietary handshake method, monitors status signals generated by the main processor 104 and the processor in the guidance module 102. The main processor 104 and the processor in the guidance module 102 generate the status signals every 10 milliseconds to indicate that they are functioning correctly. If two consecutive status signals are mnissed then the supervisory mnodule 106 assumes that there is a problem and shuts down the control unit 20.

The supervisory module 106 also monitors the state of relays and a vehicle drive line sensor in the critical I/O module 110. The vehicle drive line sensor (further descnbed below) provides the supervisory module 106 with an independent means of detecting the motion of the mining vehicle 18 and measuring the speed of the mining vehicle 18. The supervisory module 106 also controls sorme of the output relays in the critical I/O module 110. In addition, the supervisory module 106 may independenty open all of the output relays in the DeviceNet I/O module 22 if it detects any inconsistency in the uperation of the control system 10. This will cause the mining vehicle 18 to stop immediately which is aceptable since mine personnel have retrieval procedures in case the mining vehicle 18 stops in a dangerous area.

Figure 7:
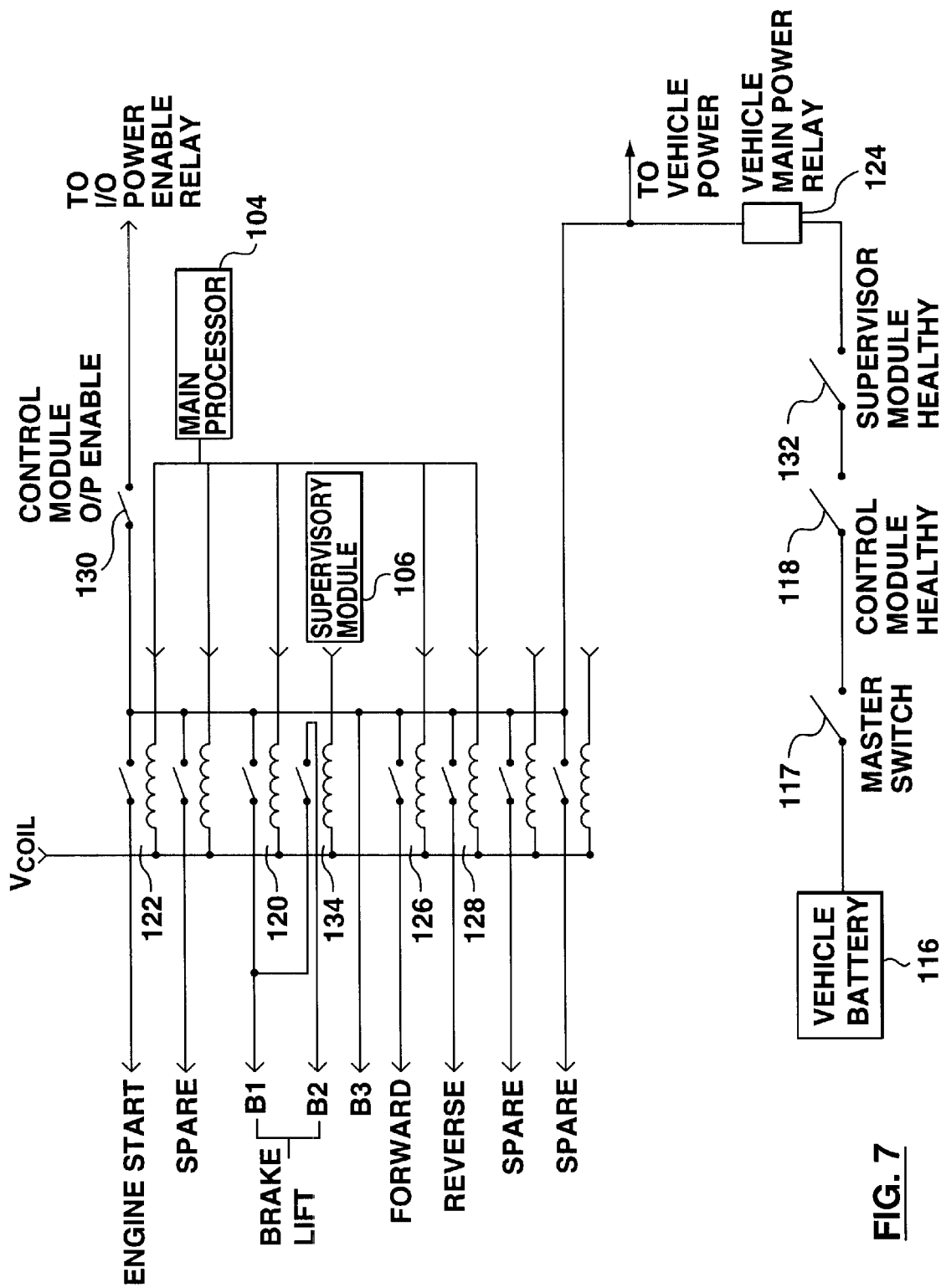
FIG. 7 shows the output relays in the critical I/O module.

The critical I/O module 110 contains the input channels and output relays which have been identified as most critical to the safe operation of the mining vehicle 18. The critical I/O module 110 is designed to be available even if the DeviceNet interface 108 is inoperable. Referring to FIG. 7, the output relays in the critical I/O module 110 are either controlled by the main processor 104 or the supervisory module 106. However, all of the relays are monitored by both the main processor 104 and the supervisory module 106 so that a failed relay may be detected and ameliorated without compromising vehicle safety. There is also a Master switch 117, which is a physical switch on-board the mining vehicle 18. The Master switch 117 is used to isolate the vehicle battery 116 (i.e. the battery residing on the mining vehicle 18) to avoid corrosion. The output relays that are controlled by the main processor 104 are a control module healthy relay 118, a brake lift relay 120, an engine start relay 122, a forward motion relay 126, a reverse motion relay 128 and a control module O/P enable relay 130. A brief description of these relays is shown in the following table.

| Output Relay | Description |
| --- | --- |
| Control Module Healthy | -in series with the supervisor module healthy relay to control the vehicle main power relay 124 |
| Brake Lift | -closed to lift brakes of mining vehicle 18 |
| Engine Start | -closed to start engine of mining vehicle 18 |
| Forward | -closed to move mining vehicle 18 forwards |
| Reverse | -closed to move mining vehicle 18 backwards |
| Control Module O/P Enable | -closed to switch power through to an I/O power enable relay which connects to the DeviceNet I/O module 22 |

The output relays in the critical I/O module 110 contrnilpd by the supervisory module 105, briefly described in the following table, are a supervisor module healthy relay 132 and an alternate brake lift relay 134. The supervisor module healthy relay 132 is in series with the control module healthy relay 118 and the vehicle main power relay 124. The vehicle main power relay 124 can switch on or off all of the power to the mining vehicle 118 and to the critical I/O outputs. Thus, relays that affect the motion of the mining vehicle 18, can be nutified by de-energizing the supervisor module healthy relay 132 or the control modulo healthy relay 118.

The alternate brake lift relay 134, which can be either in series or in parallel with brake lift relay 120 (it would depend on the brake type of the mining vehicle 18), allows the supervisory module 106 to independently apply the service brake 64 or the parking brake 66 of the mining vehicle 18 at any time. The vehicle main power relay 124 and the I/O power enable relay (not shown) are not contained within the control unil 20 because they are large relays with large current amplitudes (approximately 100 A) that geilefate a large amount of heat.

| Critical I/O module 110 output relays controlled by the supervisory module 106 | |
|---|---|
| Output Relay | Description |
| Supervisor Module Healthy | -in series with the control module healthy relay 118 to control the vehicle main power relay 124 (external) |
| Alternate Brake Lift | -closed to lift brakes on the mining vehicle 18 |

The crtical I/O module 110 also includes vehicle drive line sensors (not shown). These are two inductive proximity sensors arranged adjacent to a toothed wheel which is driven directly hy the drive shaft of the mining vehicle 18. The vehicle driveline sensors provide a pulse train whleritelv the mnining vehicle 18 is in motion. The frequency of the pulses in tho pulse train is proportional to the speed of the mining vehicle 18. By knowing the exact number of pulses per metre, the control unit 20 can determine the speed of the mining vehide 18 and the distance travilled by the mining vehicle 18. A quadrature pulse is also provided so that the direction of the mining vehicle 18 may be detected. This information is used by the main procesor 104 and the supervisory module 106 to ensure that the mining vehicle 18 is moving as commanded. This information is also used by the guidance module 102.

The DeviceNet I/O module 22 allows the control unit 20 to connect with up to 32 external devices thus allowing for expansion and cuetomization of the control unit 20. The DeviceNet I/O module 22 comprises analog and digital I/O circuitry and connects with the control unit 20 via the DeviceNet interface 108. The DeviceNet I/O module 22 also has a pair of interface connections to facilitate dalsy-chaining devices which would allow multiple DeviceNet I/O modules to be connected as required.

The digital outputs in the DeviceNet I/O module 22 are high current relay contacts with associated monitor contacts so that the relay states may be monitored by the main processor 104 and the supervisory module 108. The relay coils are switched locally by the DeviceNet I/O module 22 but derive their coil power directly from a special line in an interface bus which can be automatically interrupted in the event of system malfunction, forcing all output relays in the DeviceNet I/O module 22 to open at once. This important safety feature ensures that the mining vehicle 18 is immobilized while maintaining all other DeviwNet I/O module monitoring functions. The following table shows examples of I/O sensors and actuators that might be assigned to the DeviceNet I/O module 22.

| I/O Type | Sensor Type |
|---|---|
| Digital Inputs | Operational Interlocks, Status Alarms |
| Analog Inputs | Engine Oil Level, Engine Oil Pressure, Transmission Oil Level, Main Hydraulic Oil Level, Main Hydraulic Oil Pressure, Converter Temperature, Converter Pressure, Head Temperature Left/Right, Brake Accumulator Pressure, Engine Pressure, Fuel Level |
| Digital Outputs | Parking Brake, Bucket Roll, Bucket Dump, Boom Up, Room Down, Fire Suppression, preheat engine, gear shift select, Status Indicator Lights |
| Analog Outputs | Throttle, Steer Left, Steer Right |

The power distribution module 112 distributes regulated power to all of the modules of the control unit 20. The power distribution module 112 consists of a high performance, uninterruptable, switched-mode power supply which operates over a very wide input voltage range to ensure that the control unit 20 continues to nperate during periods of high battery drain. For instance, during engine start-up there is a voltage swing of 6 to 30 V. In this case one-tenth of a second before the engine of the mining vehicle 18 is started the main processor 104 informs the supervisory module 106 that therp will be an impending power drain and that the supervisory module 108 must ensure that the main processor 104 receives enough power during this time. This "extra power" is supplied by internal battery 194 within the control unit 20. This process also occurs before the engine of the mining vehicle 18 is shut off.

Control unit 20 usually operates on 24 V or 12 V DC batteries contained within mining vehicle 18. The power distribution module 112 also has an internal battery 194 which can provide power for up to 15 minutes when it is fully charged. However, if the interruption of power to the control unit 20 lasts five seconds or more then an automatic shutdown of the control unit 20 occurs. In this case, the control unit 20 will not try to immediately shut down in order to give the tele-operator 82 an opportunity to move the mining vehicle 18 to a safe location, i.e. away from a possible collapsible ore body. If the control unit 20 was operational when power was lost then a "Low Voltage" message will appear on the tele-operation screen 88 and the control unit 20 will automatically initiate a shutdown in 10 seconds.

The communications module 62, external to the control unit 20, includes a data transceiver which contains a radio transmitter and a radio receiver. The communications module 62 receives remoto instructions from the tele-operator 82 and relays the instructions to the control unit 20. Likewise, the communications modiule 62 sendt visual and audio data as well as data and messages about the operational status at the mining vehicle 18 from the control unit 20 to the tele-operator station 16. The communications module 62 can be any Communications module suitable for a mining environment such as 802.11 compatible wireless ethernet modems. The control unit 20 can accommodate either of the Ethernet or Modbus protocols which are both serial communications standards that define the connections and protocols associated with the transmision of data along a serial path.

The control unit 20 determines if there is interruption or interference in the radio signal received from the tele-operator station 16 by monitoring the packet sequence number of each received packet of data from the tele-operator station 16. The seqvence number is a 15-bit integer which is incremented when each new packet is transmitted.

Each control unit 20 is also identified by a unique 16-bit address code so that each control unit 20 ran ignore any packets of data that don't carry its own unique address code and which are therefore intended for a control unit 20 on another vehicle. The tele-operator station 16 sends packets of data every 50 milliseconds.

There are also a number of switches and buttons that the control unit 20 interfaces with but are external to the control lnit 20. They are the Emergency Stop button, the Local/Tele-operation Switch anid the Master switch. The Emergency Stop button is dependent on the type of mining vehicle being controlled and is usually installed in the cab and on each end of the mining vehicle 18. Activation of the Emergency Stop button will usually remove all electrical power from the mining vehicle 18. The Local/Tele-operation switch, usually mounted towards the rear of the mining vehicle 18, allows for local, manual operation of the mining vehicle 18 when the switch is set to the Local position. When the Local/Tele-Operation switch is set to the Tele-Operation position, the mining vehicle 18 may be remotely operated. The Local/Tele-Operatinn switch is also known as the Forced Wake Up/Normal Operation switch on display console 48. The Master switch, also known as the Main Shutoff switch, is typically located at the rear of the mining vehicle 18 near the battery. The Master switch isolates the battery of the mining vehicle 18 from the rest of the vehicle.

The control unit 20 also has a numbei of operational modes. These modes are SHUTDOWN, SLEEP, DOZE, STANDBY, GUIDANCE IDLF, GUIDANCE ACTIVE, TFLE-OPERATION and LOCAL. The transition from one mode to another and the operations which are possible in each mode are shown as stale diagrams in FIGS. 12 and 13 (these diagrams will be further discussed). The tele-operator 82 can select these modes at the tele-operator station 16. The LOCAL mode allows an operator to control the mining venicle 18 manually, i.e. using the controls located on-board the mining vehicle 18. In this mode the Local/Tele-operation switch is set to Local. From the LOCAL mode, the control unit 20 can be placed into the STANDBY and SHUTDOWN modes.

The SLEEP mode occurs when the mining vehicle 18 is turned off but the Master switch is on. The control unit 20 will remain in this mode until the "wake-up" command is sent by tele-operator 82 or the Master switch is turned off. Very little battery power is used in the SLEEP mode; all modules, except for the supervisory module 106 and the communications mudule 62 aro switched off The supervisory module 106 is in a reduced power mode and there are only a few milliamps available for the bootup circuitry. In the SLEEP mode, the status LEDs on the DeviceNet interface 108 are off.

The DOZE mode, in which the mining vehicle 18 is temporarily isabled, is used when rervice or mine personnel reqwirc short-term access to the mine area in which the mining vehicle 18 is located. The control tinit 20 must be in either the STANDBY or the TELE-OPERATION mode before it can he placed into the DOZE mode. In the DOZE mode, all I/O power for the mining vehicle 18 is removed to preserve the battery of the mining vehicle 18, but the control unit 20 remains active. The vehicle is effectively powered down except for the control unit 20 which remains fully active to allow for the mining vehicle 18 to be turned on faster. If the control unit 20 is left in the DOZE mode for more than one hour then the control unit 20 will automatically go into the SLEEP mode.

The SHUTDOWN mode occurs when the Master switch on the mining vehicle 18 is turned off. No "wake-up" is possible during this mode; the control unit 20 must be put into another mode to be "woken-up". The SHUTDOWN mode is initiated either remotely from the tele-operator station 16 (i.e. automatic SHUTDOWN) or locally by turning the Master switch off and pressing the Shutdown button (i.e. complete SHUTDOWN). In both automatic and complete SHUTDOWN mode, the power to the main processor 104 is off. Once the SHUTDOWN mode is started it cannot be stopped. The status LEDs on the DeviceNet interface 108 and a STBY PWR LED on the control unit 20 will flash red as the control unit 20 shuts down. Once all status LEDs on the DeviceNet interface 108 have stopped flashing and stay off, the Master switch on the mining vehicle 18 may be turned off. The mining vehicle 18 should not be woken up again until the STBY PWR LED on the control unit 20 has stopped flashing. The control unit 20 can also initiate an automatic shutdown if the Master switch on the mining vehicle 18 is turned off or the battery voltage on the mining vehicle 18 drops below a predefined threshold for more than 10 seconds. In this case, the message "Low Voltage" will appear on the tele-operation screen 88.

To "wake-up" the mining vehicle 18, the Master Switch must be turned on and the Local/Tele-Operation switch must be set to Local. This puts the control unit 20 into the LOCAL mode. The Local/Tele-Operation switch can then be set to Tele-Operation which puts the control unit 20 into the STANDBY mode. To "wake-up" the control unit 20 from SHUTDOWN mode, the Master switch must be turned on and the Local/Tele-Operation switch set to Local. From the LOCAL mode, one can then set the Local/Tele Operation switch to Tele-Operation. This process is known as a Forced wake-up.

The STANDBY mode is the usual mode of operation for the control unit 20. The STANDBY mode occurs after the control unit 20 "wakes up". As the control unit 20 wakes up, the status LEDs on mne DeviceNet interface 108 will flash green and when the mining vehicle 18 is fully powered up, all LEDs on the rontrol unit 20 will be lit. The wake-up process takes approximately two minutes. The tele-operator 92 can then start the engine of the mining vehicle 18. In the SANDBY miocie, all the I/O and lights on the mining vehicle 18 are active as well as the video buit all motion commands are disabled. The control unit 20 returns to the STANDBY mode when the Emergency Stop button is pushed at the tele-operator station 16 or the Fire Suppression alarm is activated.

Tne GUIDANCE IDLE mode and the GUIDANCE ACTIVE mode occur during the autonomous operation of the mining vehicle 10. The GUIDANCE IDLE mode occurs when the control unit 20 receives the "Guidance" commanid from the tele-operator 82. To switch into the GUIDANCE ACTIVE mode, an initial direction (i.e. forward or reverse) must be given by the tele-operator 82. However, if the tele-operation screen 88 alternately displays the messages "Guidance Idle" and "Guidance Active". then this indicates that conflicting commands are being received by the control unit 20 such as a command to move forward while the brakes are on. The control unit 20 will return to the GUIDANCE IDLE mode at the end of the autonomous operation process (i.e. when the mining vehicle 18 reaches its destination) or if the autonomous operation process is interrupted by the tele-operator 82. The control unit 20 moves to the STANDBY molly from either the GUIDANCE IDLD mode or the GUIDANCE ACTIVE mode when communication from the tele-operator station 16 has been lost for more than 1.6 seconds.

In the GUIDANCE ACTIVE mod, the tele-operator 82 can override the autonomous operation of the mining vehicle 18 at any time by pressing foot pedals 50 to control the speed of the mining vehicle 18 or by using joystick controllers 84 to steer the mining vehicle 18. The telsoperator 82 can also push an Emergency Stop button at the tele-operator stationt 16 to stop the mining vehicle 15. In the GUIDANCE ACTIVE mode, the tele-operator 82 can use the "Guidance View Select" command to view the image from the guidance camera that is currently in use. This view shows the direction that the mining vehicle 18 will take at the next Y-switch (i.e. a branch in the mine drift 38), the point at which the light rope 36 is detected, and the location of thE set point, shown by two arrows, which indicatos the center position for the mining vehicle 18 as it travels in the mine drift 38.

The TELE-OPERATION mode allows the tele-operator 82 to have full remote control of the mining vehicle 18. In this mode, the control unit mode field 98 and the vehicle identification field 90 are cleared from the tele-operation screen 88 to provide the tele-operator 82 with a clear view of the immediate environment of the mining vehicle 18. However, in the TELE OPERATION mode, errors and warnings will still be displayed on the tele-operation screen 88 if they occur while the mining vehicle 18 is being controlled. In the TELE-OPERATION mode, the control unit 20 receives inputs from both the mining vehicle 18 and the tele-operator 82. In the TELE OPERATION mode, the tele-operator 82 has 60 seconds to send a command to the control unit 20 or else the control unit 20 will go into the STANDBY mode. In this case, sending the "Reset Standby" command from the tele-operator station 16 resets the control unit 20 from the STANDBY mode to the TELE-OPERATION mode.

In the TELE-OPERATION mode, the availability of specific vehicular functions depends on the type of mining vehicle being controlled. However, there are vehicle and system functions which are common to all mining vehicles that will be controlled remotely using the control system 10. For a particular mining vehicle, other commands may be added. For instance, when the mining vehicle 18 is an LHD truck, the commands "Roll Bucket" (roll the bucket backwards), "Dump Bucket" (dump the bucket forwards), "Bucket Shake" (shake the bucket to settle the muck), "Raise the Boom", "Tare", "Weigh", etc. may be added. In addition, a RoboDig algorithm can be executed which performs a timed sequence of bucket functions to assist the mucking process. The vehicle and system commands available in the TELE-OPERATION mode are shown in the two tables which follow.

Vehicle Cummands and Corresponding Actions

| Vehicle Command | Vehicle Action |
|---|---|
| Forward | -move mining vehicle 18 forward |
| Reverse | -move mining vehicle 18 backwards |
| Steer Left | -steer mining vehicle 18 to the left |
| Steer Right | -steer mining vehicle 18 to the right |
| Service Brake | -activate the service brake |
| Parking Brake | -activate the parking brake |
| Throttle | -provide the degree of throttle selected by the tele-operator 82 |
| Engine Start | start the engine of mining vehicle 18 (the parking brake must be on and the transmission must be in neutral) |
| Gear | -select the desired gear |
| Fire Suppression | -activate the Fire Suppression system on mining vehicle 18 (this command must be received for a system-defined number of seconds in order to activate) |
| Engine Shutdown | -shut down the engine of mining vehicle 18 |

-continued

| Vehicle Command | Vehicle Action |
|---|---|
| Preheat | -preheat the engine of mining vehicle 18 |
| Horn | -sound the horn on mining vehicle 18 |

System Commands and Corresponding Actions

| System Command | System Action |
|---|---|
| Wake-Up | -wake up control unit 20 |
| Guidance Video Select | -temporarily switch the view on tele-operation screen 88 from a tele-operation camera to a guidance camera |
| Opposite View | -temporarily switch to the other tele-operation camera to check the other end of mining vehicle 18 (available in STANDBY, TELE-OPERATION and GUIDANCE modes) |
| Reset Standby | -switch from STANDBY to TELE-OPERATION mode |
| Doze | -temporarily suspend power on mining vehicle 18 but leave control unit 20 on |
| Emergency Stop | -switch control unit 20 into the STANDBY mode, stop the engine, inhibit engine start, disable gear selection, apply the service brakes, disable all motion-related outputs, set the throttle to 0% and remove the code OK output (discussed further below) |
| Guidance Active | -activate the autonomous guidance system |

For diagnostic purposes, and to increase the safety of the control systemn 10, the integrated video overlay, on tele-operation sreen 85, displays operating conditions, warning niessages (i.e. "Oil Pressure is Low") and error codes oil a need to know basis. This feature of the presuint invention has not been implemented in other mining controllers. As previously mentioned, the warnings field 92 shows messages that warn the tele-operation 82 of an impending problem with the mining vehicle 18 or the control unit 20. Example warning messages are shown in the table below. Furthermore, the error code field 96 indicates that either a fault has been found during a setf-check performed on the control unit 20, an improper command has been received from the tele-operator 82 or a problem exists with the DeviceNet networh. Example error codes are shown in the table below.

Example Warning Messages

| Warning Message | Meaning |
|---|---|
| "Check Switches" | -switches on mining vehicle 18 are not set correctly |
| "Fire Suppression Warning" | -the Fire Suppression system on mining vehicle 18 has been triggered |
| "Emergency Stop" | -the Emergency Stop button has been pressed at tele-operator station 16 |
| "Low Voltage: # VOLTS" | -the battery level on mining vehicle 18 is low -the measured battery level is displayed -control unit 20 will automatically shut down if the battery level stays low for more than 10 seconds |

Examples Error Codes

| Error Code | Meaning |
|---|---|
| 204 | -Local/Tele-Operation switch faulty |
| 804 | -forward motion monitoring error |

-continued

| Error Code | Meaning |
|---|---|
| 805 | -reverse motion monitoring error |
| 806 | -engine start monitoring error |
| 808 | -reverse run away |
| 809 | -forward run away |
| 810 | -mining vehicle 18 failed to stop |
| 1004 | -supervisor status signal not received |
| 1602 | -invalid number of tracks (i.e. the number of light ropes 36) |
| 1715 | -DeviceNet interface 108 is not being scanned |
| 17xx | -other error on DeviceNet interface 108 |

The control unit 20 has an output designated CODE OK. When CODE OK is disabled, the brakes of the mining vehicle 18 are immediately applied. Twenty seconas later the engine of the mining vehicle 18 will stop. When CODE OK is reset, the brakes of the minirny vehicle 18 will disengage, however, the engine of the mining vehicle 18 will not restart in order to start the engine of the mining vehicle 18, the control unit 20 must be shut down completely and rebooted. CODE OK is enabled if all of the following conditions are met:
1) the control unit 20 is operational and "healthy" (no errors reported);
2) the Emergency Stop button has not been pressed;
3) the fire suppression system has not been Motivated;
4) a Fire Suppression warning has not been received from the mining vehicle 18;
5) communications between the tele-operator stdtion 16 and the control unit 20 are operational;
6) the DeviceNot network is functioning properly; and
7) all permissive on the mining vehicle 18 are set correctly:
   a) the message "Check Switches" is not displayed on the tele-operation screen 88;
   b) the Master Switch is on;
   c) the Manual/Remote switch is set to Remote;
   d) the Local/Tele-operation switch is set to Tele-operation;
   e) the Parking Brake button is in (i e. parking brake is off);
   f) the Emergency Stop button is released;
   g) the transmission is in neutral;
   h) the direction selector is set to Forward; and
   i) the Forced Wake-up switch is set to Normal.

Another safety feature of the control unit 20 is that it interfaces with a field diagnostic tool which is used in the maintenance of the control unit 20. The field diagnostic tool interfaces with field service personnel to troubleshoot problems related to the control system 10 and the mining vehicle 18. The diagnostic tool is a normal laptop computer running a network access program which connects to the control unit 20 via a wired ethernet of serial RS232 connection. Once the field service personnel have connected with the control unit 20, the field service personnel may access a diagnostic program which is built into the control unit 20. The diagnostic program has a number of screens which display the state of various inputs and outputs as well as certain internal variables in the control system 10.

Another safety feature of the control unit 20 is that it interfaces with the parking brake 66 and the service brake 64 on the mining vehicle 18. The control unit 20 normally applies a signal to the parking brake 66 and when this signal disappears, for whatever reason, the parking brake 66 is applied. The control unit 20 applies and lifts the parking brake in response to commands received from the tele-operator 82.

The control unit 20 applies another signal to the service brake 64. When the mining vehicle 18 is a hydraulic vehicle, the analog signal is a pulse width modulated signal which is proportional to the amount of braking effort needed. The service brake is applied in proportion to the degree that the foot pedal 50 is pushed at the tele-operator station 16. The service broke is automatically applied whenever a movement command is not being executed. This action is independent of whether the tele-operator 82 has depressed the foot pedal 50 or not. This "neutral braking" will stop the mining vehicle 18 even if there is faulty brake control for the parking brake 65 or service brake 64, however, in extreme situations, the Emergency Stop button should be pressed. There is also a service brake monitor that generates an error condition when correct brake operation is observed. When an error does occur the power to all of the control outputs are removed which immobilizes the mining vehicle 18.

The vision guidance system of the control unit 20 is essentially a line-following system that follows the light rope 36 which hangs from the ceiling in the mine drift 38. The light rope 36 is an elongate fluorescent and/or phosphorescent element which extends along the mine drifts within which the mining vehicle 18 operates. The UV light source 34, on top of the mining vehicle 18, illuminates a substantial portion of the light rope 36 which then fluoresces and/or phosphoresces to radiate visible light. Alternatively the light rope 36 may be self illuminating and thus UV light source 34 is not needed. The front guidance camera 26. If the mining vehicle 18 is travelling forwards, or the rear guidance camera 28, if the mining vehicle 18 is travelling rearwards, will record the radiated light from the light rope 36. The tront and rear guidance cameras 26 and 28 are provided with light filters so that the image received by each camera is essentially a bright strip (i.e. the light rope 36) on a dark background as shown in FIG. 8.

Figure 8:
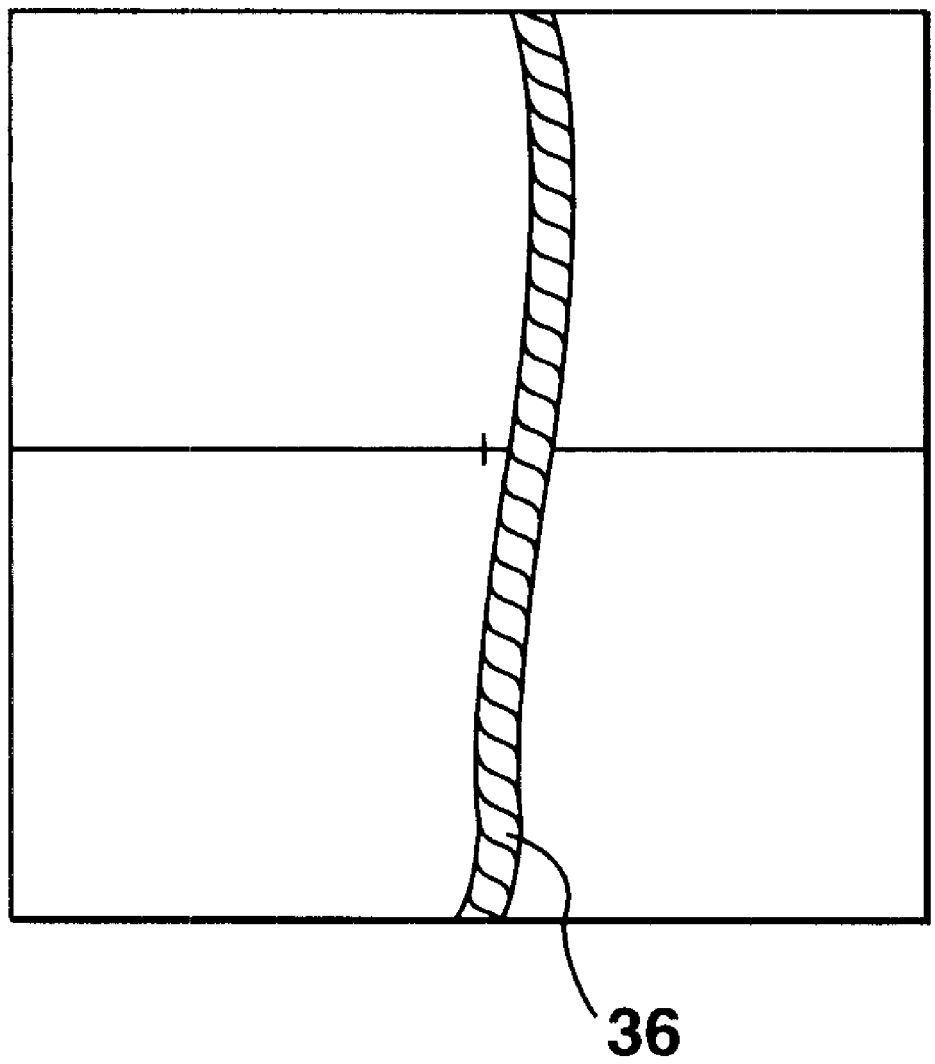
FIG. 8 is an image of a light rope produced by a guidance camera.
Figure 9:
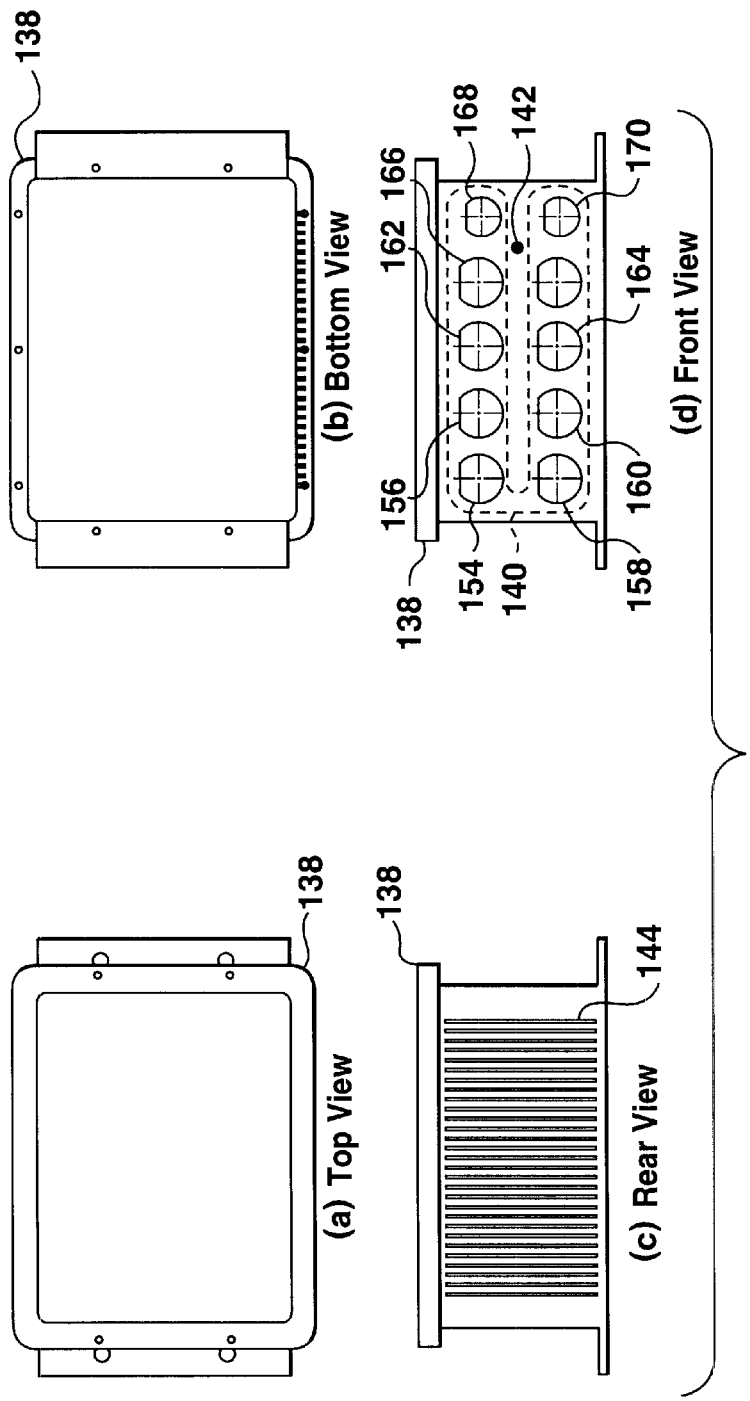
FIG. 9a is a top view of the enclosure of the control unit from FIG. 6.
FIG. 9b is a bottom view of the enclosure of the control unit from FIG. 6.
FIG. 9c is a rear view of the enclosure of the control unit from FIG. 6.
FIG. 9d is a front view of the enclosure of the control unit from FIG. 6.
Figure 10:
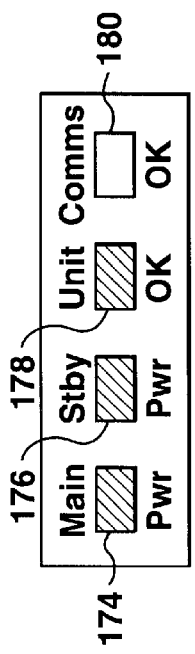
FIG. 10 shows LEDs located on the enclosure of FIG. 9.

The image in FIG. 8 (which will now be referred to as the scene) provides a clear indication of the position of the light rope 36. The vision guidance systom analyzes the scene to determine whether the light rope 36 falls to the left or right of a set point which indicates that the mining vehicle 18 is centered in the mine drift 38. The result is a number corresponding to the horizontal position at the light rope 36 in the scene. The vision guidance system reports tillis number to the main processor 104 througth a host interface. The main processor 104 stores the number and instructs the vision guidance system to process another image. The main processor 104 then uses the stored number to determine a steering correction factor which is applied to keep the mining vehicle 18 centered in the mine drift 38. At this point, the main processor 104 can also control the throttle, broke and steering actuation means on-board the mining vehicle 18 to change the movement of the mining vehicle 18.

During the autonomous operation of the mining vehicle 18, this steering correction is continually applied. The main processor 104 can also determine the location of the mining vehicle 18, set the vertical location at which the light rope 36 is detected and adjust the acceptable minimum and maximum widths of the light rope 36. The set point may also be adjusted to take into account any offset in the mounting positions of the front and rear guidance cameras 26 and 28. In addition, a short timer is used which allows the vision guidance system to "skip". short missing sections of the light rope 36. Furthermore, if the end of the light rope 36 is reached, or if the light rope 36 falls outside of the view of the guidance camera in current use, then the mining vehicle 18 will stop. In addition, if the number of light ropes detected is zero or more than two for more than a preset period of time then the mining vehicle 18 will stop.

The vision guidance system also analyzes the scene to determine if there is an upcoming curve in the mine drift 38. The vision guidance system passes this analysis to the main processor 104 which creates a control strategy to control the movement of the mining vehicle 18 according to the analysis. For instance, if an upcoming curve is detected, then the main processor 104 gears down the mining vehicle 18 and prepares the turn. Altenatively, if the scene analysis shows a straight path up ahead then the main processor 104 gears up the mining venicle 18 and goes faster. The vision guidance system can alsu recognize upcoming dips in the mine drift 38 through a training process described below. Since it is dangerous for the mining vehicle 18 to travel at high speed over a dip, the main processor 104 must slow down the mining vehicle 18 before it travels over the dip.

The vision guidance system also has a Y-switching algorithm which chooses a mine drift when there are two mine drifts to choose from. This typically occurs when the mining vehicle 18 has been loading ore at a work face, needs to reverse out of the mine drift that led to the work face and proceed in a forward direction to a dump site. In this scenario, when the mining vehicle 18 finishes reversing, the vision guidance system switches to the front guidance camera 26, recognizes a Y-switch, recognizes a different mine drift (as supposed to the mine drift where,mining vehicle 18 had been loading ore), moves forwards and follows the new mine drift. The tele-operator 82 may override the left/right direction selection at the Y-switch by using the joystick controllers 84. In fact, the tele-operator 82 can select the "Guidance View Select" command at the tele-operator station 16 to view the direction to be taken at the Y-switch and override this direction if need be. The tele-operator 82 can also press the service brake 64, parking brake 66 or the Emergency Stop button to stop the mining vehicle 18.

The vision guidance system also provides a means to program a travel route with a desired velocity profile for the mining vehicle 18 to follow. To do this, tele-operator 82 remotely maneuvers the mining vehicle 18 through the travel route. During this time, the vision guidance system records the commands of the tele-operator 82 as well as odometer and visual data so that it can create a control strategy. During subsequent autonomous operation, the vision guidance system will follow this programmed route. However, the commands of the tele-operator 82 are not reproduced exactly. Instead, the vision guidance system uses the commands of the tele-operator 82 to anticipate intersections, changes of direction, slope and tilt in the mine drift and makes speed and movement adjustments accordingly. To aid in autonomous operation, different sections of the light rope 36 can be remotely turned on and off as required to define a particular route.

The autonomous operation of the mining vehicle 16 would be used by the tele-opprator 82 once the mining vehicle 18 has been loaded. The tele-operator 82 can then instruct the mining vehicle 18 to follow a pre-determined path between a muck pile and an pre pass. The tele-operator 82 can then operate another mining vehicle which needs to be loadad or needs to dump its load.

A preferred embodiment of the control unit 20 will now be described in terms of the enclosure, hardware and software. The enclosure and hardware are specifically designed to address the harsh operating conditions which exist in underground miries such as acidic moisture, high levels of dust, high temperature and severe vibrations.

Referring now to FIGS. 9a, 9b, 9c, 9d and 10, the enclosure 138 of control uinit 20 is constructed with sturdy 9.5 mm (⅜") welded aluminum and has dimensions of 18 cm×25 cm×36 cm (7"×10"×14"). The cnclosure 138 incluides military style connector 140 and a pressurization port 142. On the rear of the onclosure 139 are heat dissipation fins 144.

The military style connectors include a rear tele-operation camera connector 154, a front tele-operation camera connector 156, a rear guidance camera connector 168, a front guidance camera connector 160, a critical I/O connector 162, a communications module connector 164, an ethernet connector 166, a DeviceNet I/O module connector 168 and a power connector 170. The rear and front tele-operation camera connectors 154 and 166 connect the control unit 20 to the rear and front tele-operation cameras 32 and 30 respectively. The rear and front guidance camera connectors 188 and 160 connect the control unit 20 to the rear and front guidance cameras 28 and 26 respectively. The critical I/O connector 162 connects the critical I/O module 110, within control unit 20, to the I/O devices on-board the mining vehicle 18 which are critical to the safety of the control system 10 such as the parking brake 66, the service brake 64, etc. The communications module connector 164 connects the control unit 20 to the communications module 62. The DeviceNet I/O module connector 168 connects the control unit 20 to the DeviceNet I/O module 22 and the power connector 170 connects the control unit 20 to the battery on-board the mining vehicle 18.

There are also four status LEDs on the front of the enclosure 138 that describe the status of the control unit 20. The LEDs are MAIN PWR LED 174, STBY PWR LED 176, UNIT OK LED 178 and COMMS OK LED 180. The MAIN PWR LED 174 indicates that the I/O power of the mining vehicle 18 is active (i.e. the mining vehicle 18 is awake). The STBY PWR LED 176 indicates that the control unit 20 is being powered from the battery of the mining vehicle 18 and that the control unit 20 is waiting to be activated. The STBY PWR LED 176 stays on as long as there is power provided by the battery of the mining vehicle 18. If the STDY PWR LED 176 is flashing, then the control unit 20 has lost external power from the mining vehicle 18 and is running from its internal battery 194. The STBY PWR LED 176 also flashes during the normal shutdown sequence. The UNIT OK LED 178 indicates that the control unit 20 is active and has passed all internal seft-checks. The UNIT OK LED 178 is not lit if an error is displayed on the tele-operation screen 88. The COMMS OK LED 180 indicates that valid data is being received by the control unit 20 from the tele-operator station 16.

To address the acidic mine environment, the enclosure 138 is gas pressurized to an internal pressure of approximately 8 psi gauge. This is necessary since there is usually an external pressure on the enclosure 138 of approximately 2 to 3 psi gauge due to changes of pressure within a mine and elevational changes as the mining vehicle 18 travels through a mine. These by constantly changing pressures can cycle moist air in and out of an unsealed enclosure, leading to a build up of acidic moisture which can shorten the lifetime of any electronics, within the enclosure, to 3 months. The pressurization port 142 on the enclosure 138 is used to introduce dry nitrogen gas into the enclosure 138 to pressurize the enclosure 138. The enclosure 138 is also sealed properly to maintain this internal pressure and avoid the ingress of moisture or dirt. To maintain pressure, an O-ring sealed case is used for the enclosure 138 and sealed circular, military style external connectors 140 are used to connect the control unit 20 to external devices. This sealing complies with NEMA 4 standards, however the enclosure 138 is not completely hermetically sealed because it has a removable cover. Accordingly, the enclosure 138 must be re-pressurized each month to replace escaped gas. In practice, the inventors have found that the aforementioned sealing method, with monthly re-pressurizations, has been successful in preventing the ingress of soil or moisture in a usage period of approximately 10 months.

To address the vibrations induced by the mine environment, which can be as large as ½" to ¼" at 500 Hz, the internal components of the control unit 20 have been designed to withstand shocks and vibrations. In particular, the enclosure 138 and its physical components have a rigid design so the components within the enclosure 138 are held down securely. Furthermore, thread sealant is used to avoid having the screws, which hold down the components, "unscrew" themselves. Silicon rubber is also used in spots to secure certain components. In addition, physical wiring is used instead of jumper cables which can move very easily due to vibrations. The control unit 20 also has flexible circuits (i.e. flex-circuits) which can withstand vibrations better than conventional flat circuit boards. The flexible circuit boards have a very low mass to withstand vibrations. In addition, the flexible circuit boards have resulted in a reduction of physical wiring. The control unit 20 also includes shock mountings (not shown) so that the control unit 20 can be shock-mounted on the mining vehicle 18. As a result of these design choices, the control unit 20 can handle vibrations greater than 100 g peak.

To address the libat found in underground mines, and in particular to avoid having the internal components of the control unit 20 overheat, a fan is used to equalize the heat within the enclosure 138. Furthermore, a heat pipe 172 is used to transport heat away from the main processor 104 within the control unit 20. One end of the heat pipe 172 is attached to the inside of the back plate of the enclosure 138 while the other end of the heat pipe is attached to the main processor 104. Since both ends of the heat pipe 172 have to stay at substantially the same temperature, as the temperature of the main processor 104 increases, the flow late of the fluid within the heat pipe 172 increases to transport heat away from the main processor 104 and onto the back plate of the enclosure 138 where the beat dissipation fine 144 reside. Based on these design choices, the control unit 20 has an operating temperature range of 0° C. to 50° C. and a storage temperature range of −20° C. to 70° C. Usually there is an internal temperature of 30° C. to 40° C. after the control unit 20 has been on for a while, however if the control unit 20 gets too hot then it will shut down The control unit 20 has been designed for an application specific purpose in which some commercially available components are used but the overhead of other manufacturer's proprietary systems are avoided. The end rosult is a reduction in the number of individual discrete systems that mrakp up the control unit 20. To achieve this, the functions of the control unit 20 have been combined in various modules. This has a number of benefits such as a reduced number of connections, a smaller enclosure and an increase in systems reliability. To further increase systems reability, self-monitoring and device diagnosis are an integral part of the design of the control unit 20. Furthermore, all sub-systems havo been designed with the underground mine environment in mind.

Figure 11:
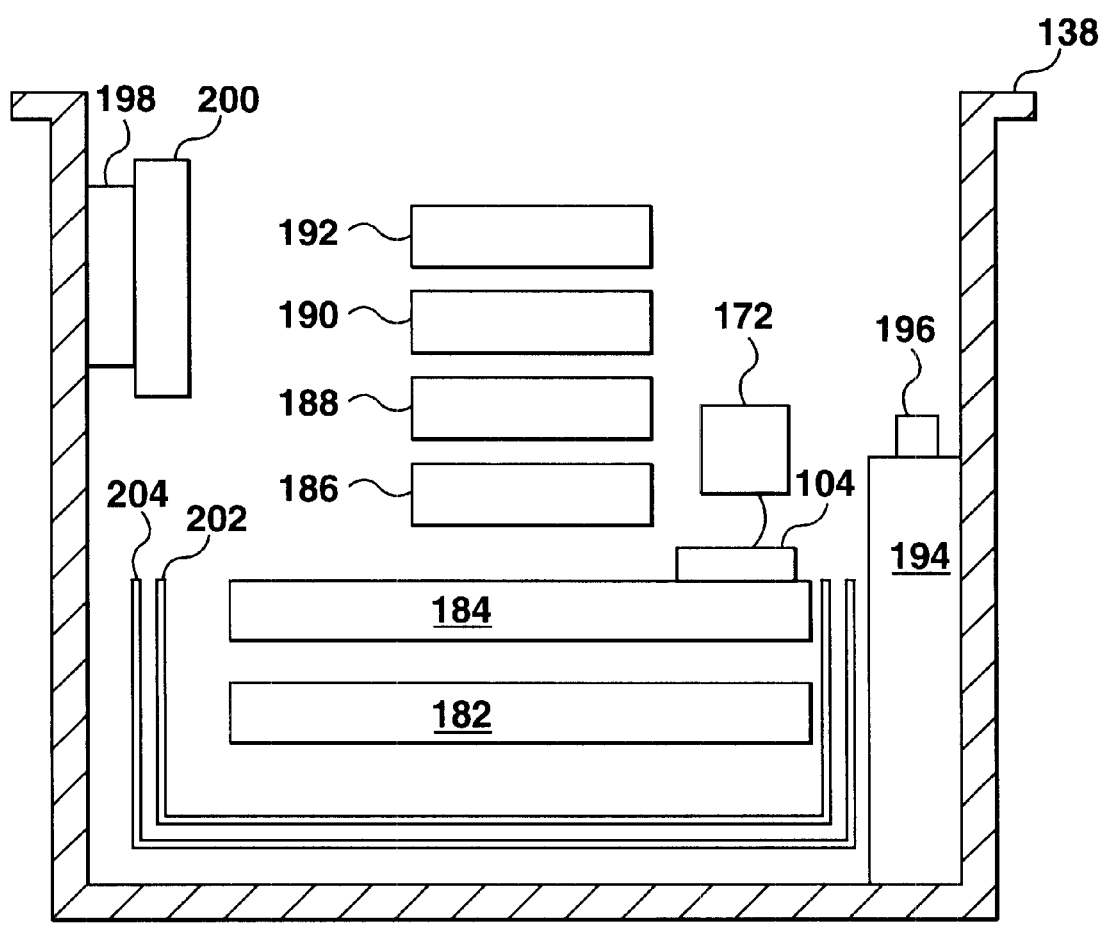
FIG. 11 is an interior view of the enclosure of FIG. 9 showing the physical layout of the hardware of the control unit.

FIG. 11 shows the physical layout of the hardware used to implement the modules described in FIG. 6. Referring to FIG. 11, the hardware of the control unit 20 comprises a metherboard 182, a main processor board 184 with the main processor 104, a DeviceNet card 186, a video overlay card 188, a mux/IO card 190, a video card 192 and flex circuits 202 and 204. Alternatively, several flex circuits may be used. Also included in enclosure 138 is heat pipe 172, an internal battery 194, a pressure sensor 196, a power supply 198 and a flash card 200. The heat pipts 172, power supply 198, nash card 200, motherboard 182 and flex circuits 202 and 204 are custom made while the rest of the cards are off the shelf PC104 cards. The flex circuits 202 and 204, motherboard 182, DeviceNet card 116, video overlay card 188, mux/IO card 190 and video card 192 all plug into the main processor board 184.

The main processor board 184, which is an industry standard EBX size board (i.e. complies with the Embedded Board expandable standard which specifies physical standards for small embedded circuit boards), contains 8 analog inputs which are used to monitor voltage, temperature and enclosure pressure. An ethernet interface is embedded within the main procssor board 184. The ethernet intertace is connected to the ethernet connector 166.

The motherboard 182 contains a battery charging unit, a switching power supply, a switching power converter and power routing circuitry. The motherboard 182 also contains the supervisory module 106 and the critical I/O module 110. The critical I/O module 110 is hardwired. The motherboard 182 uses the switching power supply to charge up internal battery 194. The switching power supply is designed to keep the internal battery 194 fully charged. The switching power supply is also designed to work with a wide range of voltage levels received from the battery of the mining vehicle 18 so that low voltage levels on the battery of the mining vehicle 18 will not impede the full charging of the internal battery 194.

Flex circuits 202 and 204 contain interconnect for the external connections ot the control unit 20 and internal connections for routing power, video, audio and data signals. The flex circuits 202 and 204 thus connect to the military style connectors 140 and to the video card 192, the mux/IO rard 190 and the video overlay card 188. The flex circuit 202 handles signals and the flex circuit 204, with thicker copper conductors, handles power.

The motherboard 182 and flex circuits 202 and 204 nave been designed to hide much of the hardware complexity of the control unit 20. The reduced complexity allows a mining vehicle technician to easily learn the control unit 20 and easily transfer the control unit 20 to another mining vehicle (which occurs routinely). Other prior art controllers have more wiring which makes it hard for a mining vehicle technician to install and remove the controllers.

The flash card 200 is a 250 MD PCMCIA solid state flash drive. PCMCIA (i.e. Personal Computer Memory Card International Association) sets the physical, electrical and software sipecifications for PC memory cards The flash card 200 stores the operating system of the control unit 20 and the controller program as well as vehicle ani operation-specific configuration data.

The video module 100 is implemented by mne video overlay card 188 and the mux/IO card 190. The video overlay card 188 is used to dynamically display messages correctly on the tele-operation screen 88 regardless of the underlying video image. The mux/IO card 190 contains video and audio processing circuits. The mux/IO card 190 communicated with the video overlay card 188 and the video card 192 and also receives input from the front and rear tele-operation cameras 30 and 32, the front and rear guidance cameras 26 and 28, the vehicle condition sensors and valve drive relays which interact with the electro-hydraulic portion of the mining vehicle 18.

The guidance module 102 is implemented by the mux/IO casd 190 and the video card 192. The video card 192 has a DSP processor which is used to analyze the video signal, provided by the mux/IO card 190, to determine the position of the mining vehicle 18 in relation to the light rope 36 when the mining vehicle 18 is operating in autonomous mode.

The DeviceNet card 186 implements the DevicoNet interface 108 shown in FIG. 8. The DeviceNet card 186 provides a scanning function and an electrical interface with an external I/O bus which is connected to a number of digital and analog sensors and relays on the mining vehicle 18. These are the sensors and actuators which monitor and control the action of the mining vehficle 10 under commands received from the tele-operator 82, or under autonomous operation. The DeviceNet card 186 performs an internal self-diagnosis check ant reports the working status of each device on the DeviceNet network evon when the control unit 20 is in the STANDBY mijade. When new I/O devices arp added to the control unit 20, no hardware changes need to be made to the DeviceNet card 186; the device.net configuiration file simply needs to be updated to reflect the new I/O devices.

The pressure sensor 196 is used to measure the pressure within the enclosure 138. These pressure measurements are done to maintain the enclosure 138 at a sufficient internal pressure to present ingress of moisture from the mine environment. Typically a positive pressure of between 3 and 8 psi gauge is maintained. This compensates for variations in the external pressure as the mining vehicle 18 moves vertically in a mine.

The internal battery 194 maintains sufficient power to the main processor 104 when the engine of the mining vehicle 18 is started. The internal battery 194 is also used to provide power to the main processor 104 to ensure that there is adequate time for an orderly shutdown of the control unit 20 in the event of a power loss or operator shutdown. The selected battery should preferably have excellent vibration resistance and be able to preferably be mounted in any orientation.

The power supply 198 conditions the power received from the motherboard 182 to provide tightly regulated 5 and 12 V supplies to the variou sub-systems of the control unit 20.

The software implementation of control unit 20 is based on an embedded Windows™ NT operating system. There is no external user interface to the Windows™ NT operating system, however, the ethernet connection can be used to change the configuration (i.e. the network settings) of the Windows™ NT operating system. However, the ethernet connection cannot be used to install or reinstall operating system components. In this case, the operating system can only be accessed through the flash drive on flash card 200.

The functionality of the control unit 20 is implemented by a controller program that runs with real-time priority in the Windows™ NT environment. The controller program is an object oriented program which is written using classes in Microsoft C++. The controller software program has three groups of classes: monitoring, input and output. The controller program also emulates a Modicon Modbus slave so that the control unit 20 can communicate with tele-operator stations that are PLC based. Software changes/updates to the controller program can be done remotely using the ethernet connection; i.e. any file can be copied, deleted or erased. Software changes include updating the controller program and updating the I/O configuration (i.e. the device.net file).

Figure 12:
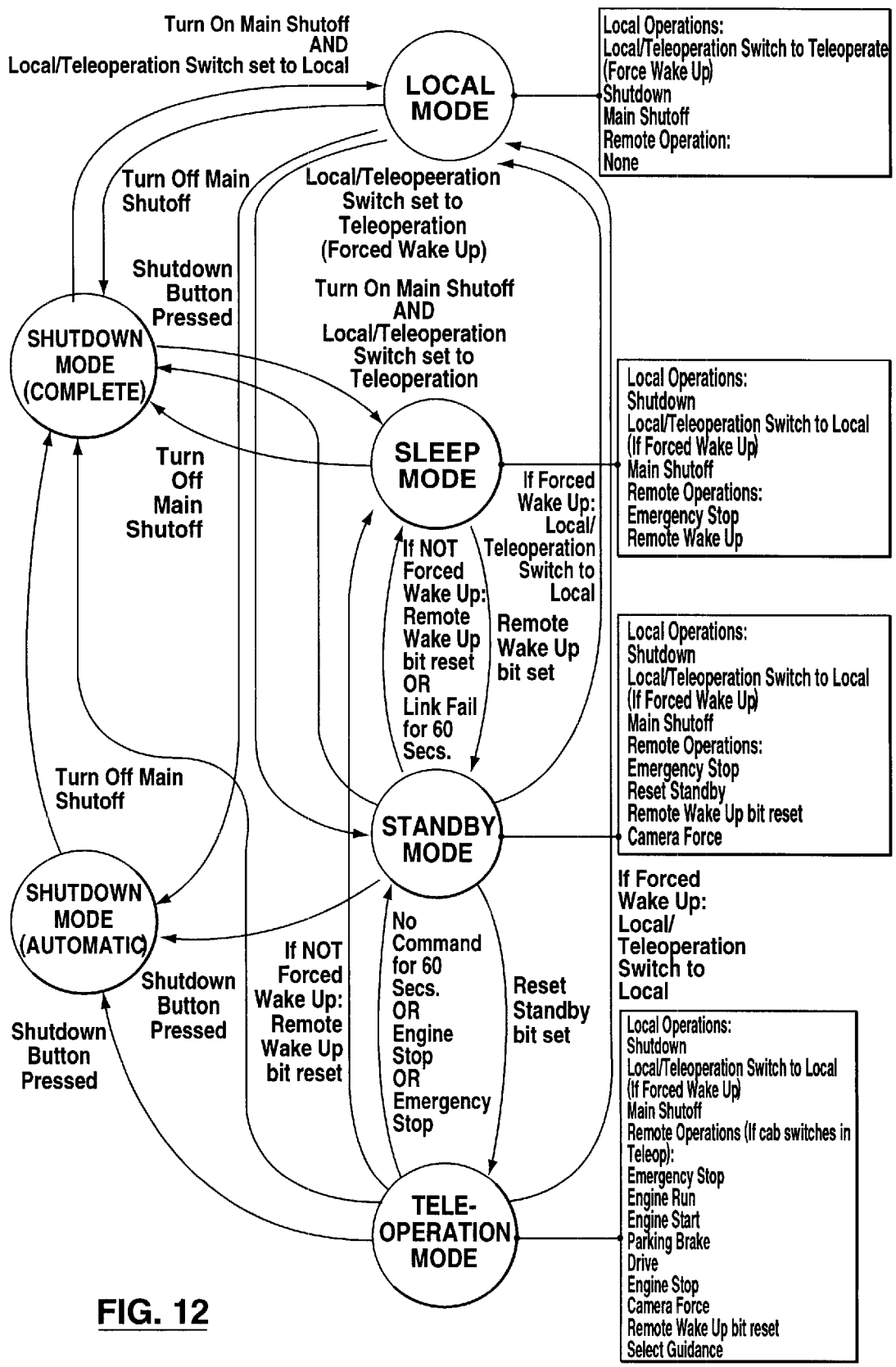
FIG. 12 shows a state machine which dictates the operation of the control unit from FIG. 6 when the control unit is predominantly operating in LOCAL mode.
Figure 13:
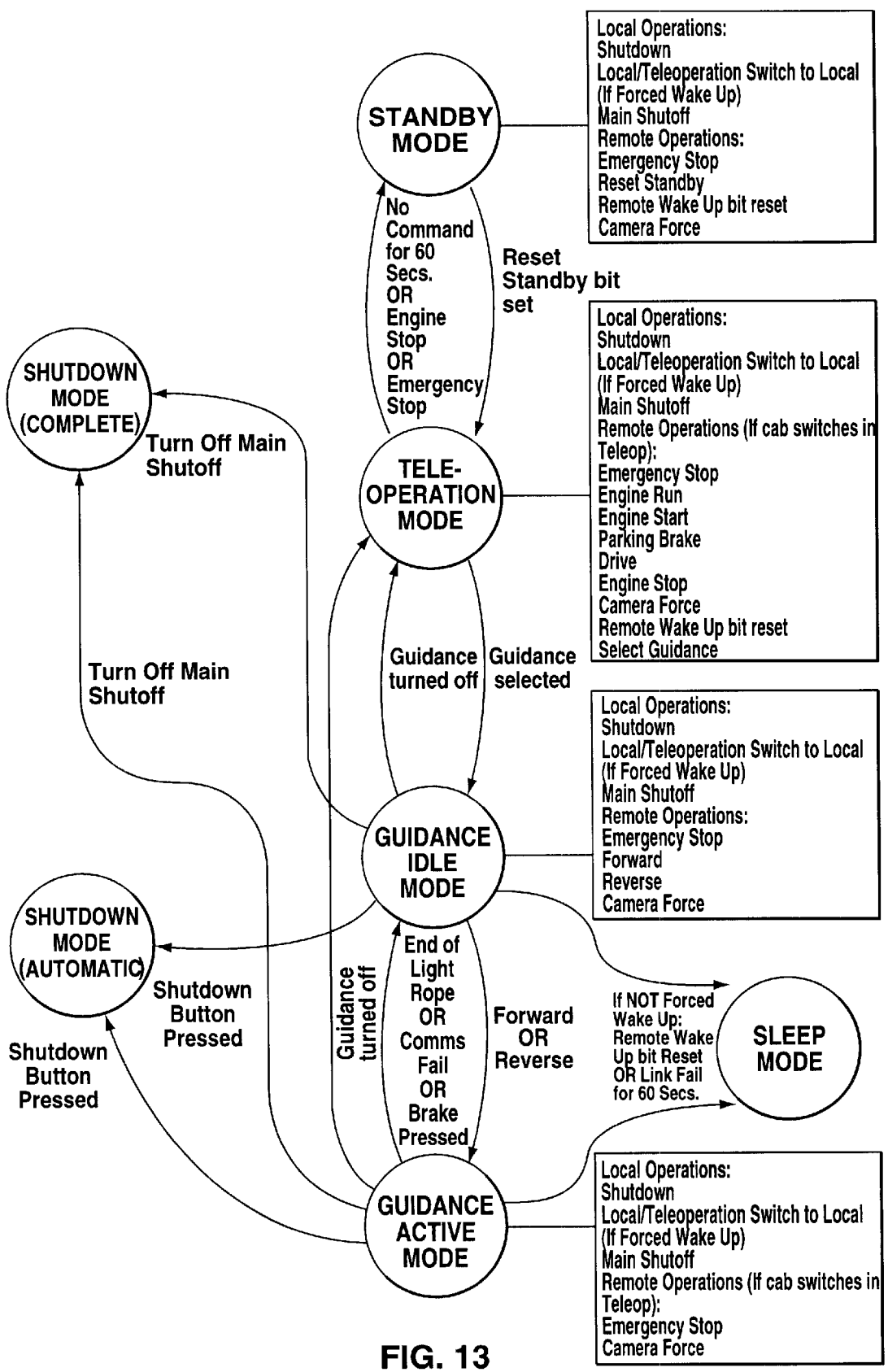
FIG. 13 shows a state machine which dictates the operation of the control unit from FIG. 6 when the control unit is predominantly operating in TELE-OPERATION mode.

The controller program implements a state macnine with each state representing a mode of operation for control unit 20. These modes of operation, discussed previoubly, are SHUTDOWN, SLEEP, DOZE, STANDBY, GUIDANCE IDLE, GUIDANCE ACTIVE, TELE-OPERATION and LOCAL. The state machine defines state transitions based on the inputs that are received from the tele-operator 82 and the mining vehicle 18 FIG. 12 depicts the state machine when the mining venlcle 18 is operated in predominantly the LOCAL mode whereas FIG. 13 depicts the state machine when the mining vehicle 18 is operated in predominantly the TELE-OPERATION mode. In both of these figures, the circles represent stotes, the lines with arrows on one end represent state transitions with the arrows indicating the direction of state transition and the accompanying text describing the condition needed to make a particular state transition. The rectangular boxes depict ane operations which are possible in each state.

Figure 14:
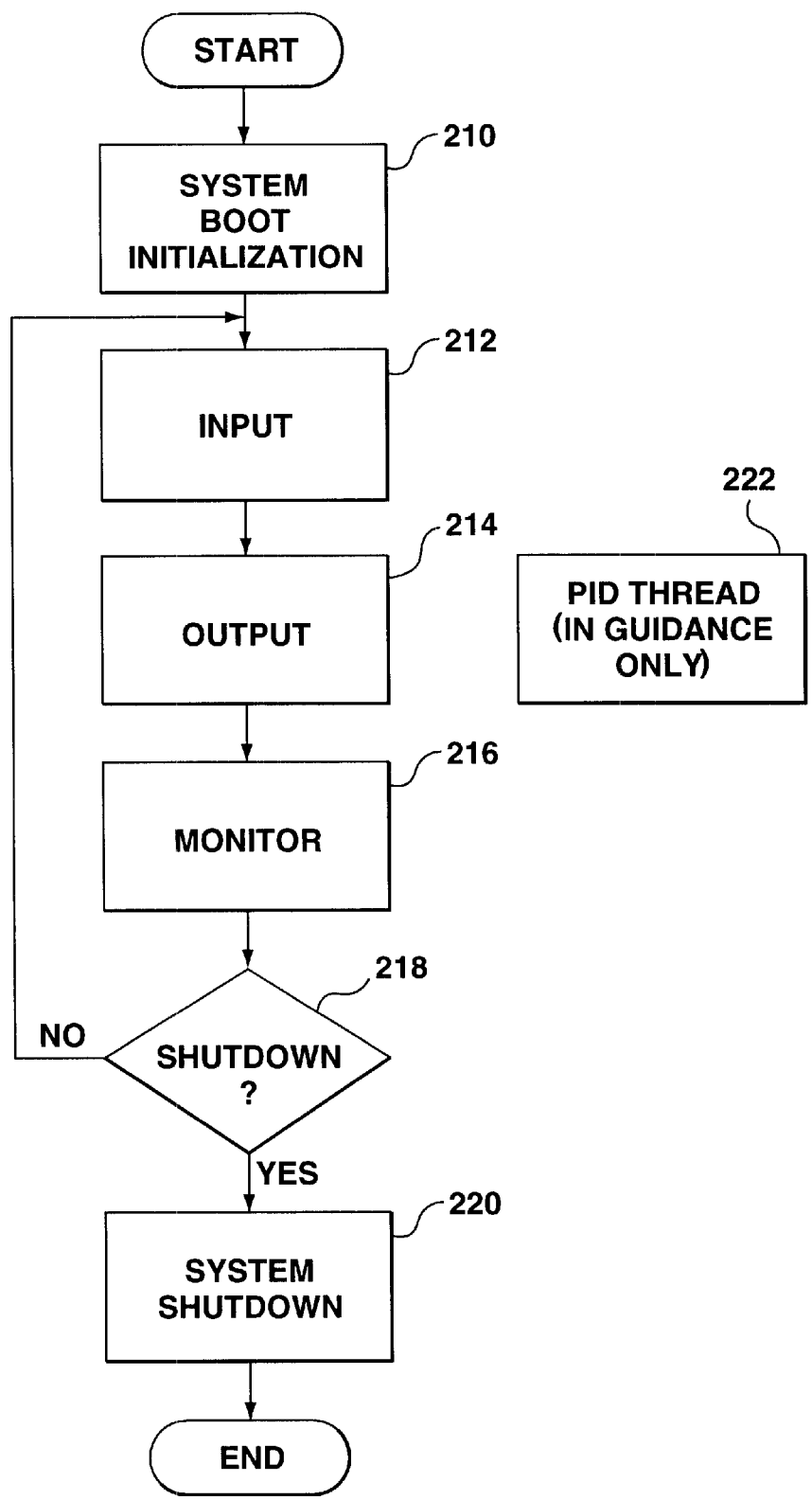
FIG. 14 is a flowchart of the controller program.

Referring to FIG. 14, the controller program runs in a cyclic fashion. First, in step 210 the control unit 20 is booted up and initialized. Next, in step 212, all of the inputs are checked and certain operations are performed based on value of the inputs. Tne controller program then updates the outputs in step 214 and again performs certain operations based on the upuated outputs. Next, in step 216, the controller program monitors various system components. Next, in step 218, if the controller program has not being told to shut down then the process loops back up to step 212, otherwise the next operation is step 220 where the controller program initiates a shutdown seqwenre. There is also a PID guidance thread 222 which is shown as being disjoint in FIG. 14 because the PID guidance thread 222 only exists when the control unit 20 is in the GUIDANCE ACTIVE mode. The Input process 212, Output process 214, Monitor process 216 and PID guidance thread 222 will now be discussed in more detail.

Figure 15:
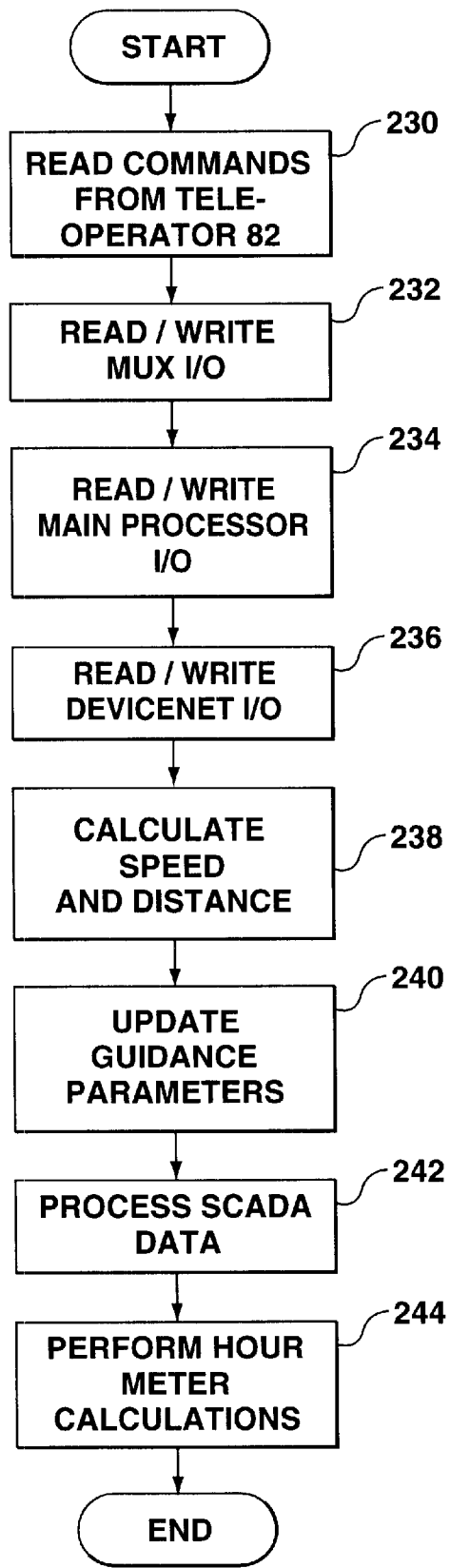
FIG. 15 is a flowchart of the input process of the controller program.

Referring to FIG. 15, the Input process 212 begins at step 230 where the controller program determines if any commands from tele-operator 82 have been received. Some exemplary commands include "Emergeriuy Stop", "Fire Suppression", "Move Forwards", "Move in Reverse", "Steer Left", "Steer Right", "Apply Brakes", etc. Next, in step 232, the controller program performs a read/write operation, using the Mux/IO card 190, based on commands received from the tele-operator 82. In step 234, the controller program performs a read/write operation on the I/O controlled by the main processor 104. Measurements in this step include the voltage level of the battery on the mining vehicle 18, the voltage level of the internal battery 194 within the control unit 20 and the temperature and pressure within the enclosure 138.

The next step in the Input process 212 is step 236 where a read/write operation is done I/O the DeviceNet I/O module 22. This step includes reading voltage levels from pressure sensors, temperature sensors and the like on the mining vehicle 18. This step also includes writing to hydraulic valve actuators on the mining vehicle 18. In step 238, the speed of the mining vehicle 18 and the distance travelled by the mining which 18 are regulated. The controller program then move to step 240 where it updates the guidance parameters such as the maximum speed that the mining vehicle 18 can travel while operating in the GUIDANCE ACTIVE mode. These updated parameters are based on the commands received from the tele-operator 82. Next, in step 242, the controller program processes SCADA data (i.e. Supervisory Control And Data Acquisition) in which all monitoring data on the mining vehicle 18 is read, calibrated and transmitted to the tele-operator station 16. In step 244, the controller program then perfnrms hour meter calculations in which the amount of time that the engine of mining vehicle 18 has been running for is recorded.

Figure 16:
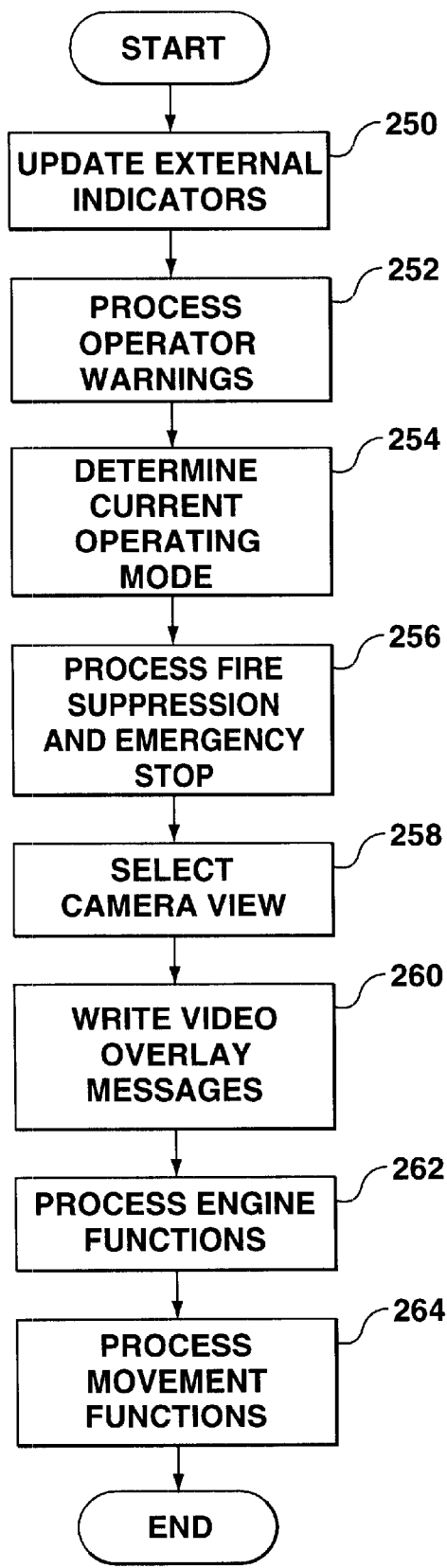
FIG. 16 is a flowchart of the output process of the controller program.

Referring now to FIG. 16, the Output process 214 begins at step 250 where the controller program updates the UNIT OK LED 178 and the COMMS OK LED 180 on the enclosure 138. The controller program then processes operator warnings in step 252 if any exist. Operator warnings include "Control Interlocks", "Low Vehicle Battery Voltage", "Engine Oil Low", "Check Engine", "Transmission Oil Low", "Transmission Oil High", "Hydraulics Need Servicing", "Shut Down Hydraulics", "Check Fire Suppression System", "Fire Suppression System Activated", "Failed To Stop", "Forward Runaway", "Reverse Runaway", "Movement Inhibited", etc.

The controller program then determines the current operating mode of the control unit 20 in step 254. Next, in step 256, the controller program determines if the Emergency Stop button was pushed by the tele-operator 82 or if the Fire Suppression alarm was set off on the mining vehicle 18. In step 258, the controller program determines if it has to select a different camera view other than the one currently in use. Next, in step 260, the controller program writes overlay messages on the tele-operation screen 88 if need be. The controller program then performs engine functions on the engine of the mining vehicle 18 in rtop 262 if need be. The engine functions include preheating, starting and stopping the engine of the mining vehicle 18. In step 264, the controller program processes movement functions such as moving the mining vehicle 18 forward, moving the mining vehicle 18 rearwards, steering the mining vehicle 18 to the left, steering the mining vehicle 18 to the right, applying the brakes on the mining vehicle 18 and changing gears on the mining vehicle 18. Other movement functions would be dependent on the specific mining vehicle being controlled by control system 10.

Figure 17:
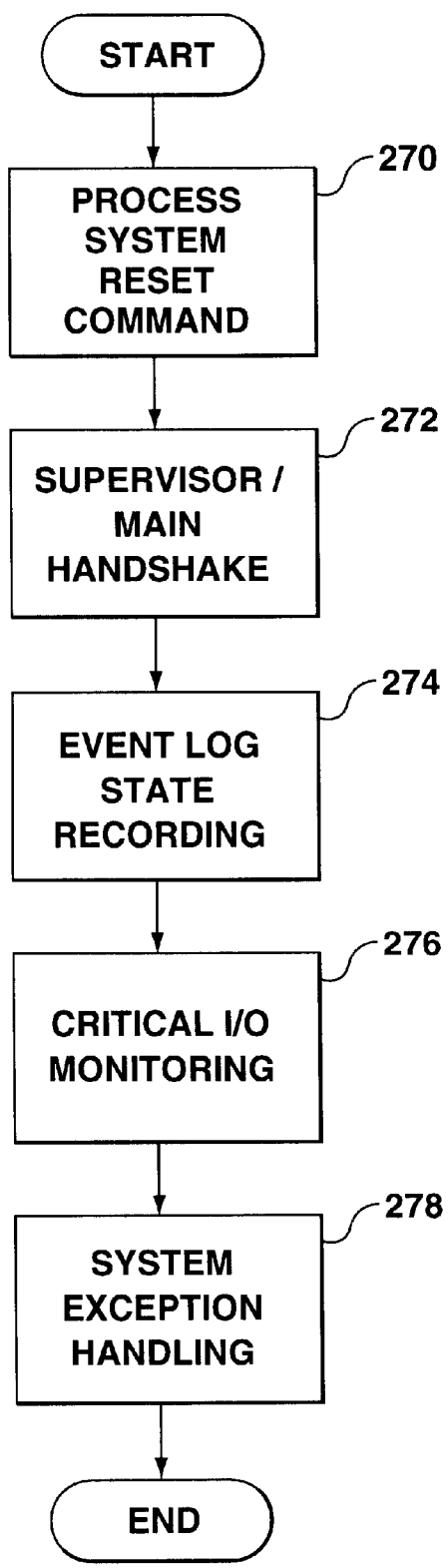
FIG. 17 is a flowchart of the monitor process of the controller program.

Referring next to FIG. 17, the Monitoring process 216 begins at step 270 where the controller program processes a "System Reset" command from the tele-oporator 82 if the command was given. Next, in step 272, the controller program performs the handshaking between the processor of the supervisory module 106 and the main processor 104. The controller program then performs event state log recording in step 274 in this step. events are recorded in a file with the date and time at which they occurred so that these events may be examined on or off-line. Examples of events which are recorded are changes in operating mode such as from the TELE-OPERATION mode to the GUIDANCE IDLE mode. Other events include system initialization, communications failure, atc. Next, in step 276. the controller program monitors the critical I/O. In step 278, the controller program performs system exception handling in which abnormal conditions are datected by the controller program. These abnormal conditions may be caused by externa faults (e g a cable problem) or internal faults within the control unit 20. When an exception is detected, the mining venicle 18 is immediately stopped and an error code is displayed on the tele-operation screen 88. The exception is also recorded in the file used for event state log recording.

The controller program is a mult-threaded application that can spawn a new application whicn runs independenty of the main program. An example of this is the PID guidance thread 222 which implements a Proportional Integral Derivative (PID) control loop. The PID guidance thread 222 is spawned when the control unit 20 is in the GUIDANCE ACTIVE mode and is used to maintain the mining vehicle 18 centered in the mine drift 38. During the PID guidance thread 222, the controller program is running at a slower repetition rate because the emphasis is on steering the mining vehicle 18.

Figure 18:
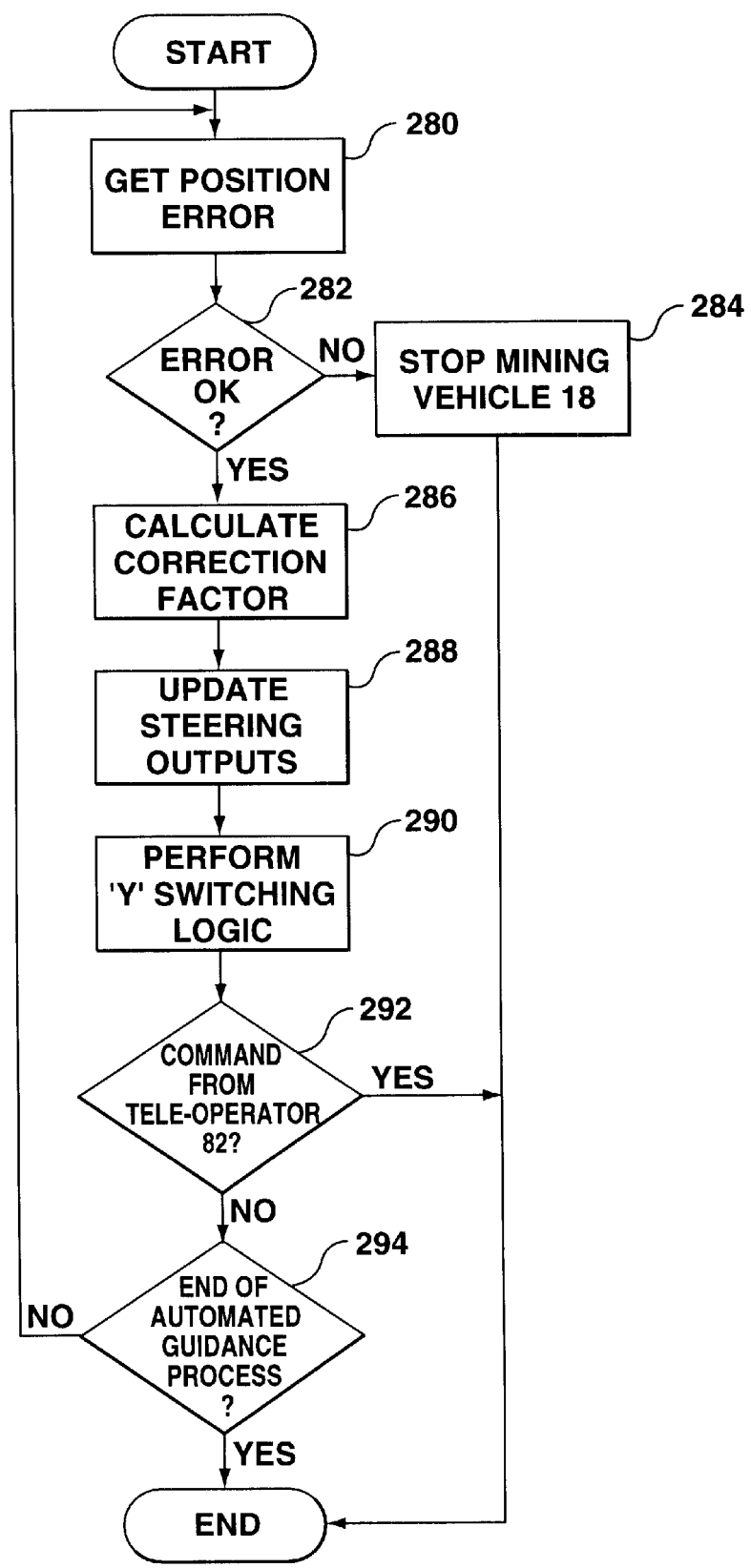
FIG. 18 is a flowchart of a PID guidance thread.

Referring to FIG. 18. the PID guidance thread 222 begins at stop 280 where a position error is calculate. The PID guidance thread 222 calculates the position error based on the pixel value where the light rope 36 occurs in the scene, which is obtained from the guidance module 102, and the set-point (i.e. the point at which the mining vehicle 18 would be centered in the mine drift 38). A counter is used to monitor timely throughput of data so that if there is no data received, or the daft received from the guidance module 102 is invalid, then the control unit 20 will indicate an error and stop the mining vehicle 18.

The PID guidance thread 222 then determines if the position error is acceptable in step 282. If the position error is too large then the PID guidance thread 222 moves to step 284 where the mining vehicle 18 is stopped. Otherwise, if the position error is acceptable, then in step 286, a correction factor is calculated. The correction factor is then applied to the steering outputs in step 286. Next, in step 290, the PID guidanie thread 222 performs Y-switching logic to ensure that the mining vehicle 18 is correctly oriented in the current tramming operation. Next, in step 292, if the control unit 20 had received a movement related command from the tele-operator 82 then the PID guidance thread 222 will end and the control unit 20 will respond to the command from the televpoerator 82. If no such command is received from the tele-operator 82, then in stop 294, the PID guidance thread 222 determines wheiner the mining vehicle 18 has reached its destination. If this is true, then the PID guidance thread 222 will terminate, otherwise, the PID guidance thread 222 will proceed to stop 280.

In an alternative embodiment, the control system 10 can be used with an ethernet based communications link between control unit 20 and tele-operator station 16. The primary benefit of an ethernet based communications link is that it will allow for a bank of tele-operators to control mining vehicles in which one tele-operator can control one mining vehicle, switch to a different mining vehicle to control, then switch to another mining vehicle to control and so forth. This cannot be done with the ModBus protocol because the ModBus protocol requires a strict one-to-one correspondence between a tele-operator and a mining vehicle. With an ethernet based communications link, this one-to-one correspondence can be preserved and the tele-operator 82 can also switch to different mining vehicles as desired. Another benefit of an ethernet based communications link is that a secure, high speed internet connection can be used which would allow for remote control from anywhere in the world.

It will be appredatea that althougn the present invention has teen described in terms of controlling a Load Haul Dump truck, the present invention could be applied to a variety of other mining machines, either fixed or mobile, and could be used in either underground mines or surface mines. For instance, the present invention may be readily adapted to loaders. diamond drilling machines, drifting machines blast hole loading machines, mucking machines, shotcrete machines and trackles tramming units. The present invention may also be used with vehicles unrelated to mining such as heavy farm equipment, heavy construction equipment, etc.

It is to be understood that what has been described are preferred embodiments of the invention. The invention nonetheless is susecteptible to certain changes and alternative embodiments fully comprehended by the spirit of the invention as described above, and the scope ot the claims set out below.

We claim:

1. A control unit, for mounting with a machine, for enabling control thereof from a tele-operator station via a communications channel, the control unit comprising:

(1) a control input for receiving control signals from the tele-operator station;

(2) a digital processing means connected to said control input for processing said control signals and generating commands;

(3) a control output for providing said commands to the machine;

(4) a second input connected to said digital processing means for receiving data from sensors on the machine indicative of the location and status of the machine; and, (5) a data output for providing visual data to the tele-operator station;

wherein, the control unit is adapted to operably switch between a manual mode in which the machine is controlled locally by controls on the machine, an autonomous mode in which the machine is controlled by data received through the second input, and a tele-operation mode in which the machine is controlled remotely by said control signals based at least in part on said visual data.

2. A control unit at claimed in claim 1, wherein the digital processing means comprises a main processor and a supervisory processor, the supervisory processor being connected to the main processor for control thereat, and for interrupting operation of the main processor and disabling the machine when an error is detected in the operation of the control unit.

3. A control unit as claimed in claim 2, which includes at least one of: the main processor being adapted to transmit a status signal to the supervisory processor and the supervisory processor being adapted to send random status inquiry signals to the main processor, wherein the supervisory processor interrupts the operation of the main processor if the status signal is not received for a predetermined period of time.

4. A control unit as claimed in claim 2, which includes a device interface for communication with external devices.

5. A control unit as claimed in claim 2, for use with a mobile machine, said mobile machine having a drive unit, for driving the mobile machine, and brakes, wherein the output of the control unit includes a command signal for actuating the brakes on the mobile machine, and wherein each of the main processor and the supervisory processor include separate means for sending a brake command signal, to effect actuation of the brakes.

6. A control unit as claimed in claim 5, that further comprises a guidance module for guiding the mobile machine.

7. A control unit, as claimed in claim 6, wherein the output of the control unit includes commands for controlling the drive and transmission unit of the mobile machine and the steering of the mobile machine, whereby to control the direction and speed of said mobile machine.

8. A control unit as claimed in claim 7, wherein the guidance module is adapted to provide autonomous operation of said mobile machine, and includes a centering means, a position determining means, a route following means, a Y-switching means and a route learning means.

9. A control unit as claimed in claim 2, which includes a separate device input/output module, for permitting communication With additional devices on the machine.

10. A contol unit as claimed in claim 2, which includes a critical input/output module, for controlling critical input and output signals, the critical input/output module being connected to and controlled by the main processor and the supervisory processor, whereby the critical input/ouput module is disabled if either one of the main processor and the supervisory processor is inoperative.

11. A control unit as claimed in claim 10, in combination with a mobile machine including: a drive unit; a steering actuation means; a brake; and a plurality of machine sensors for indicating machine status; wherein the critical input/output module and the device input/output module are connected to the plurality of machine sensors, the drive unit, the brakes and the steering actuation means for providing diagnostic information.

12. A control unit as claimed in claim 10, wherein the control unit is adapted to disable the machine in a safe location to allow maintenance by service personnel.

13. A control unit as claimed in claim 1, wherein said second input includes separate inputs from a plurality of vision sensors and at least one microphone.

14. A control unit as claimed in claim 13, which includes at least one of: a forward looking sensor and a rearward looking sensor adapted to provide visual data of the imnmediate location of said mobile machine, respectively, in front of the mobile machine and behind the mobile machine; at least two vision sensors mounted to provide visual data indicative of the position of the mobile machine, for autonomous operation of said mobile machine.

15. A control unit as claimed in claim 14, wherein each vision sensor comprises a video camera.

16. A control unit as claimed in claim 1, in combination with a tele-operator station including at least one display screen, wherein said data output further provides information regarding the status of the machine, and said at least one display screen includes at least one tele-operation screen and at least one computer graphics screen, said at least one tele-operation screen displaying a video overlay image for displaying said visual data and messages about the operational status of the machine, and said computer graphics screen is adapted to provide said operational information.

17. A control unit as claimed in claim 1, further comprising an enclosure for housing a plurality of modules, said modules being adapted for providing a reduced number of connections therebetween and for reducing the size of said enclosure.

18. A control unit as claimed in claim 17, wherein the enclosure includes a pressurization port, for presurizing the enclosure with dry gas to a pressure in excess or ambient pressure.

19. A control unit as claimed in claim 18, wherein the enclosure is pressurized above a minimum pressure of 3 psi gauge.

20. A control unit as claimed in claim 18, wherein the enclosure is pressurized to a pressure of at least 8 psi gauge.

21. A control unit as claimed in claim 17, wherein said enclosure is sealed and comprises connectors all adapted to prevent ingress of moisture.

22. A control unit as claimed in claim 17, wherein said enclosure comprises at least one flexible circuit board having an interconnect for providing external and internal connections, said interconnect being adapted to reduce the hardware complexity of said control unit and said flexible circuit board being sufficiently flexible to withstand vibrations.

23. A control unit as claimed in claim 17, wherein said modules comprise:

a) a main processor;

b) a vision module connected to said main processor for processing visual information regarding the location of said machine;

c) a guidance module connected to said main processor and said vision module for providing autonomous operation of said machine;

d) a device interface and an inpuvoutput module both connected to said main processor and to various devices on said machine for monitoring and control thereof;

e) a supervisory module connected to each module for monitoring operability of said control unit; and, f) a power distribution module connected to each module for providing and regulating power thereto, whereby said modules provide an integrated control system housed within said enclosure.

24. A control unit as claimed in claim 23, wherein the connectors are military-style connectors, whereby the connectors are used to connect the control unit to external devices.

25. A control unit as claimed in claim 1, which includes shock mountings for mounting the control unit on the machine.

26. A control unit as claimed in claim 1, which is adapted to allow a tele-operator station to control two or more machines.

27. A control unit as claimed in claim 1, wherein the machine is a vehicle.

28. A control unit as claimed in claim 27, which is adapted to allow a tele-operator station to control two or more vehicles.

29. A control unit as claimed in claim 1, wherein said control unit further has an external interface that allows for the updating of software, within the control unit, which directs the activity of the control unit.

30. A control unit as claimed in claim 29, wherein the external interface is an ethernet interface and the software updating can be done remotely.

31. A control unit as claimed in claim 1, wherein the control unit is adapted to switch between said modes without stopping the operation of said machine.

32. A control unit as claimed in claim 1, wherein said tele-operation mode allows for both line of sight and non-line of sight remote control.

33. A control unit, for mounting on a machine, for enabling control thereof from a tele-operator station via a communications channel, the control unit comprising:

(1) a control input for receiving control signals from the tele-operator station;

(2) a digital processing means connected to said control input for processing said signals and generating commands, said digital processing means comprising a main processor and a supervisory processor connected to the main processor for monitoring the main processor to ensure safe operation of the machine;

(3) a control output for providing said commands to the machine;

(4) a second input for receiving data from sensors on the machine indicative of the status of the machine; and, (5) an enclosure adapted to prevent ingress of contaminants, said digital processing means being located in said enclosure.

34. A control unit as claimed in claim 33, which includes at least one of: the main processor providing periodic status signals to the supervisory processor indicating correct operation of the main processor; and the supervisory processor randomly querying the status of the main processor, to ensure correct operation of the main processor.

35. A control unit as claimed in claim 33 or 34, for use with the machine, the machine comprising a vehicle including a drive unit, a steering actuation means and a brake, wherein the supervisory processor includes a separate input for control commands from the tele-operator station for controlling operation of the drive unit, the steering actuation means and the brakes of the vehicle, wherein the supervisory processor ensures that the main processor correctly acts on these control signals and wherein the supervisory processor includes a separate brake means, for applying the brakes to the vehicle, if any error in operation of the main processor is detected.

36. A control unit as claimed in claim 33, wherein the control unit is adapted to operably switch between a manual mode in which the machine is controlled locally by controls on the machine, an autonomous mode in which the machine is controlled by data received through the second input, and a tele-operation mode in which the machine is controlled remotely from the tele-operator station by said control signals received through the control input, wherein said tele-operation mode allows for both line of sight and non-line of sight remote control of said machine.

37. A control unit as claimed in claim 33, wherein said control unit has a data output for providing visual data regarding the location of the machine and operational information regarding the status of the machine to the tele-operator station.

38. A control unit as claimed in claim 33, wherein said enclosure houses a plurality of modules, said modules being adapted for providing a reduced number of connections therebetween and for reducing the size of said enclosure.

39. A control unit as claimed in claim 38, wherein the enclosure includes a pressurization port, for pressurizing the enclosure with dry gas to a pressure in excess of ambient pressure.

40. A control unit as claimed in claim 39, wherein the enclosure is pressurized above a minimum pressure of 3 psi gauge.

41. A control unit as claimed in claim 39, wherein the enclosure is pressurized to a pressure of at least 8 psi gauge.

42. A control unit as claimed in claim 38, wherein said enclosure is sealed and comprises connectors all adapted to prevenit ingress of moisture.

43. A control unit as claimed in claim 42, wherein the connectors are military-style connectors, whereby the connectors are used to connect the control unit to external devices.

44. A control unit as claimed in claime 38, wherein said enclosure comprises at least one flexible circuit board having an interconnect for providing external and internal connections, said interconnect being adapted to reduce the hardware complexity of said control unit and said flexible circuit board being sufficiently flexible to withstand vibrations.

45. A control unit as claimed in claim 38, wherein said modules comprise:

a) a main processor;

b) a vision module connected to said main processor for processing visual information regarding the location of said machine;

c) a guidance module connected to said main processor and said vision module for providing autonomous operation of said machine;

d) a device interface and an inpuvoutput module both connected to said main processor and to various devices on said machine for monitoring and control thereof;

e) a supervisory module connected to each module for monitoring operability of said control unit; and, f) a power distribution module connected to each module for providing and regulating power thereto, whereby said modules provide an integrated control system housed within said enclosure.

46. A control unit as claimed in claim 33, which includes shock mountings for mounting the control unit on the machine.

47. A method of controlling a machine from a remote tele-operator station via a communications channel, the method comprising:
   (a) providing the machine with a control unit comprising a main processor and a supervisory processor connected to the main processor, the control unit providing modes of operation comprising manual operation, autonomous operation, and tele-operation;
   (b) selecting a desired mode of operation;
   (c) operating the machine in the desired mode of operation; and,
   (d) receiving visual data from the control unit at the tele-operator station enabling activity of the machine to be monitored in at least one the modes of operation and
   (e) monitoring the main processor with the supervisory processor to ensure safe operation of the machine, and wherein at least one of the main processor provides periodic status signals to the supervisory processor to indicate correct operation of the main processor; and the supervisory processor randomly queries the status of the main processor.

48. A method as claimed in claim 47, wherein said activity comprises remote control operation of said machine.

49. A method as claimed in claim 48, which includes, for selection of the tele-operation mode of operation, the further steps of:
   (1) configuring the machine and the control unit to allow for tele-operation of the machine;
   (2) sending a series of commands to the control unit from the tele-operator station, to direct activity of the machine; and,
   (3) monitoring said data to allow for the remote control of said machine.

50. A method as claimed in claim 48, wherein said visual data provides information about the immediate environment of the machine, data indicative of the operational status of the machine and messages about the condition of the machine.

51. A method as claimed in claim 50, which includes displaying the visual data on at least one video screen, providing the messages as an overlay image on the at least one video screen and providing the operational status data on at least one computer graphics screen.

52. A method as claimed in claim 51, in which the messages include at least one of an indication of the view shown, machine identification, warnings and error codes.

53. A method as claimed in claim 47, wherein the method further includes the step of updating software, within the control unit, which directs the activities of the control unit.

54. A method as in claim 47, wherein the machine is a vehicle.

55. A method as claimed in claim 54, wherein for selection of the autonomous mode operation, the method includes:
   (1) selecting a path along which the vehicle is to travel;
   (2) providing a guidance system for guiding the vehicle along the path; and
   (3) guiding the venicle along said selected path.

56. A method as claimed in claim 55, which includes, providing for the vehicle to travel along a plurality of selected paths, and for each path, first causing the vehicle to traverse a path in the tele-operation mode and simultaneously recording operator inputs, and, in subsequent autonomous mode operation, providing for the control unit to use the operator inputs for travelling each path.

57. A method as claimed in claim 56, which includes continually monitoring the status of the main processor of the control unit via the supervisory processor, and, if an error is detected, sending an error signal to the tele-operator station and actuating brakes on the vehicle to stop the vehicle.

58. A method as claimed in claim 57, wherein the vehicle is disabled in a safe location to allow maintenance by service personnel.

59. A method as claimed in claim 47, which includes providing for placing the control unit in a shutdown mode when deactivated and for initially putting the control unit into a sleep mode when the control unit is turned on, and the method further including sending a control signal from the tele-operator station to the control unit to put the control unit into standby mode for operation.

60. A method as claimed in claim 59, which includes, for autonomous operation, switching the control unit into a guidance idle mode, and for tele-operation, switching the control unit into a tele-operation mode.

61. A method as claimed in claim 60, wherein the machine is a vehicle.

62. A method as claimed in claim 61, which includes enabling the control unit to be placed into a doze mode, to tempoarily disable the vehicle to enable personnel to access an area in which the vehicle is located.

63. A method as claimed in claim 60 or 62, which includes providing, for the autonomous mode of operation, the guidance idle mode, in which the control unit receives a guidance command and awaits further commands before causing the vehicle to move, and a guidance active mode in which an initial direction is selected, and in which the vehicle commences movement in the selected direction.

64. A control unit, for mounting on a machine, for enabling control thereof from a tele-operator station via a communications channel, the control unit comprising:
   (1) a control input for receiving control signals from the tele-operator station;
   (2) a digital processing means connected to said control input for procesesing said signals and generating commands;
   (3) a control output for providing said commands to the machine; and,
   (4) a second input for receiving data from sensors on the machine indicative of the status of the machine, wherein, said digital processing means comprises a main processor and a supervisory processor connected to the main processor for monitoring the main processor to ensure safe operation of the machine, and wherein at least one of: the main processor provides periodic status signals to the supervisory processor to indicate correct operation of the main processor; and the supervisory processor randomly queries the status of the main processor, to ensure correct operation of the main processor.

* * * * *